(12) United States Patent
Zhao et al.

(10) Patent No.: US 11,864,187 B2
(45) Date of Patent: Jan. 2, 2024

(54) RESOURCE ALLOCATION METHOD AND APPARATUS

(71) Applicant: HUAWEI TECHNOLOGIES CO., LTD., Shenzhen (CN)

(72) Inventors: Yue Zhao, Beijing (CN); Zheng Yu, Beijing (CN); Yongqiang Fei, Shenzhen (CN); Fang Nan, Shenzhen (CN); Xingqing Cheng, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 638 days.

(21) Appl. No.: 16/990,635

(22) Filed: Aug. 11, 2020

(65) Prior Publication Data

US 2020/0383092 A1 Dec. 3, 2020

Related U.S. Application Data

(63) Continuation of application No. PCT/CN2018/076849, filed on Feb. 14, 2018.

(51) Int. Cl.
*H04W 72/0453* (2023.01)
*H04W 72/23* (2023.01)
*H04L 5/00* (2006.01)

(52) U.S. Cl.
CPC ........... *H04W 72/23* (2023.01); *H04L 5/0007* (2013.01); *H04L 5/0044* (2013.01);
(Continued)

(58) Field of Classification Search
CPC . H04W 72/23; H04W 72/0453; H04W 72/02; H04L 5/0007; H04L 5/0044; H04L 5/0053; H04L 5/0094
See application file for complete search history.

(56) References Cited

U.S. PATENT DOCUMENTS 10,567,136 B2 * 2/2020 You .......................... H04L 5/00
10,743,351 B2 * 8/2020 Hwang ................. H04L 5/0012
(Continued)

FOREIGN PATENT DOCUMENTS

CN 104936290 A 9/2015
CN 106376050 A 2/2017
(Continued)

OTHER PUBLICATIONS

Huawei et al., "On Sub-RB resource allocation for MTC PUSCH", 3GPP TSG RAN WG1 Meeting #91 R1-1719465, Reno, USA, Nov. 27-Dec. 1, 2017, Total 6 Pages.
(Continued)

*Primary Examiner* — Hanh N Nguyen
(74) *Attorney, Agent, or Firm* — Stein IP, LLC

(57) ABSTRACT

A resource allocation method and an apparatus to reduce mutual interference between neighboring cells. The method includes: determining, by a first terminal device based on a physical cell identity PCID of a first cell accessed by the first terminal device and a preset rule, a subcarrier group corresponding to the first terminal device, where the subcarrier group corresponding to the first terminal device includes some subcarriers in a subcarrier set corresponding to the first terminal device. A communications system supports sub-PRB resource allocation.

12 Claims, 14 Drawing Sheets

(52) U.S. Cl.
CPC .......... *H04L 5/0053* (2013.01); *H04L 5/0094* (2013.01); *H04W 72/0453* (2013.01)

(56) References Cited

U.S. PATENT DOCUMENTS

| | | | |
|---|---|---|---|
| 2008/0056183 A1 | 3/2008 | Gorokhov et al. | |
| 2013/0094411 A1 | 4/2013 | Zhang | |
| 2016/0021565 A1 | 1/2016 | Kim et al. | |
| 2016/0262165 A1 | 9/2016 | Lee et al. | |
| 2016/0294528 A1* | 10/2016 | Kim | H04W 72/23 |
| 2016/0302051 A1 | 10/2016 | Lindoff et al. | |
| 2018/0006864 A1 | 1/2018 | Hwang et al. | |

FOREIGN PATENT DOCUMENTS

| | | |
|---|---|---|
| CN | 107078990 A | 8/2017 |
| CN | 107295653 A | 10/2017 |
| CN | 107426819 A | 12/2017 |
| WO | 2017024874 A1 | 2/2017 |
| WO | 2017113901 A1 | 7/2017 |
| WO | 2017123286 A1 | 7/2017 |
| WO | 2017133339 A1 | 8/2017 |
| WO | 2017167078 A1 | 10/2017 |

OTHER PUBLICATIONS

Sony, "Consideration on NB-PDCCHfor Nb-Iot", 3GPP TSG RAN WG1 Meeting #84 R1-160669, St Julian s, Malta, 15"-19" Feb. 2016, Total 7 Pages.

Intel Corporation, "Design of sub-PRB PUSCH for efeMTC", 3GPP TSG RAN WG1 Meeting #91 R1-1720044, Reno, USA, Nov. 27-Dec. 1, 2017, Total 6 Pages.

LG Electronics, Remaining aspects of PUCCH resource allocation. 3GPP TSG RAN WG1 Meeting #70, Qingdao, China, Aug. 13-17, 2012, R1-123532, 5 pages.

* cited by examiner

RESOURCE ALLOCATION METHOD AND APPARATUS

CROSS-REFERENCE TO RELATED APPLICATIONS

This application is a continuation of International Application No. PCT/CN2018/076849, filed on Feb. 14, 2018, the disclosure of which is hereby incorporated by reference in its entirety.

TECHNICAL FIELD

Aspects of this application relate to the communications field, and in particular, to a resource allocation method and an apparatus.

BACKGROUND

To increase spectral efficiency of a physical uplink shared channel (PUSCH), a resource allocation method supporting sub-PRB allocation is proposed for eFeMTC in Release-15. PRB is short for a physical resource block ( ), and sub-PRB resource allocation means that a resource allocation granularity is less than one PRB. For example, resource allocation of six, three, and two subcarriers is supported according to a current standard.

However, the sub-PRB resource allocation method may cause mutual interference between neighboring cells. As shown in FIG. 1, a physical cell identity (PCID) of a cell 1 is 0, a PCID of a cell 2 is 1, and the cell and the cell 2 are two neighboring cells. It is assumed that UE 1 is in the cell and currently uses first three subcarriers of a PRB 1 to transmit uplink data, and UE 2 is in the cell 2 and also uses the first three subcarriers of the PRB 1 to transmit uplink data. In this case, the UE 1 and the UE 2 interfere with each other. Therefore, a method for reducing mutual interference between the neighboring cells is urgently needed.

SUMMARY

Embodiments of this application provide a resource allocation method and an apparatus, to reduce mutual interference between neighboring cells.

According to a first aspect, an embodiment of this application provides a resource allocation method, including: determining, by a first terminal device based on a physical cell identity PCID of a first cell accessed by the first terminal device and a preset rule, a subcarrier group corresponding to the first terminal device, where the subcarrier group corresponding to the first terminal device includes some subcarriers in a subcarrier set corresponding to the first terminal device. It may be understood that the first cell may be any one of at least one cell. Therefore, terminal devices in different cells may determine corresponding subcarrier groups based on PCIDs of the cells in which the terminal devices are located and the preset rule, so that the terminal devices in the different cells can determine different subcarrier groups. This can reduce interference between neighboring cells.

In a possible implementation, the determining, by a first terminal device based on a physical cell identity PCID of a first cell accessed by the first terminal device and a preset rule, a subcarrier group corresponding to the first terminal device includes: determining, by the first terminal device based on the PCID of the first cell, a subcarrier group corresponding to the first terminal device in each of at least one consecutive time interval corresponding to the first cell.

In a possible implementation, there is an offset of R subcarriers or subcarrier groups between subcarrier groups corresponding to the first terminal device in adjacent time intervals in the at least one time interval, where R is an integer.

In a possible implementation, lengths of all time intervals in the at least one time interval are the same or different.

In a possible implementation, each of the at least one time interval corresponding to the first cell is the same as or different from each of at least one time interval corresponding to a second cell.

In a possible implementation, the first terminal device corresponds to at least two candidate subcarrier groups, and each candidate subcarrier group includes a plurality of consecutive subcarriers.

In a possible implementation, the first terminal device corresponds to two candidate subcarrier groups when the subcarrier set corresponding to the first terminal device includes three consecutive subcarriers of one resource block, and the subcarrier group corresponding to the first terminal device includes two consecutive subcarriers in the subcarrier set, where a first candidate subcarrier group includes a first subcarrier and a second subcarrier in the subcarrier set, and a second candidate subcarrier group includes the second subcarrier and a third subcarrier in the subcarrier set. Alternatively, the first terminal device corresponds to four candidate subcarrier groups when the subcarrier set corresponding to the first terminal device includes 12 consecutive subcarriers of one resource block, and the subcarrier group corresponding to the first terminal device includes three consecutive subcarriers in the subcarrier set, where a first candidate subcarrier group includes a first subcarrier to a third subcarrier in the subcarrier set, a second candidate subcarrier group includes a fourth subcarrier to a sixth subcarrier in the subcarrier set, a third candidate subcarrier group includes a seventh subcarrier to a ninth subcarrier in the subcarrier set, and a fourth candidate subcarrier group includes a tenth subcarrier to a twelfth subcarrier in the subcarrier set. Alternatively, the first terminal device corresponds to two candidate subcarrier groups when the subcarrier set corresponding to the first terminal device includes 12 consecutive subcarriers of one resource block, and the subcarrier group corresponding to the first terminal device includes six consecutive subcarriers in the subcarrier set, where a first candidate subcarrier group includes a first subcarrier to a sixth subcarrier in the subcarrier set, and a second candidate subcarrier group includes a seventh subcarrier to a twelfth subcarrier in the subcarrier set.

In a possible implementation, when the subcarrier set corresponding to the first terminal device includes three consecutive subcarriers of one resource block, and the subcarrier group corresponding to the first terminal device includes two consecutive subcarriers in the subcarrier set, the determining, by the first terminal device based on the PCID of the first cell, a subcarrier group corresponding to the first terminal device in each of at least one consecutive time interval corresponding to the first cell includes: when M is an odd number, the first terminal device corresponds to the first candidate subcarrier group in an initial time interval in the at least one consecutive time interval corresponding to the first cell, and when M is an even number, the first terminal device corresponds to the second candidate subcarrier group in the initial time interval, where M=PCID mod N, N is a positive integer, PCID is the PCID of the first cell, and mod is a modulo operation; or when M is an even number, the first terminal device corresponds to the first candidate subcarrier group in an initial time interval in the at least one consecutive time interval corresponding to the first cell, and when M is an odd number, the first terminal device corresponds to the second candidate subcarrier group in the initial time interval, where M=PCID mod N, N is a positive integer, PCID is the PCID of the first cell, and mod is a modulo operation. In a possible implementation, when the subcarrier set corresponding to the first terminal device includes three consecutive subcarriers of one resource block, and the subcarrier group corresponding to the first terminal device includes two consecutive subcarriers in the subcarrier set, each time interval T corresponding to the first cell=($2^L$) Tmin, where L=floor {(PCID mod N)/2}, floor is a round-down function. N is a positive integer, mod is a modulo operation, and Tmin is a time unit.

In a possible implementation, when the subcarrier set includes 12 consecutive subcarriers of one resource block, and the subcarrier group corresponding to the first terminal device includes three consecutive subcarriers or six consecutive subcarriers in the subcarrier set, each time interval T corresponding to the first cell=($2^L$) Tmin, where L=(PCID mod N) N is a positive integer, PCID is the PCID of the first cell, mod is a modulo operation, and Tmin is a time unit.

In a possible implementation, R is a preset value. Alternatively, the first terminal device obtains R by using downlink control information, higher layer signaling, radio resource control signaling, or broadcast signaling.

In a possible implementation, the first terminal device obtains M by using downlink control information, higher layer signaling, radio resource control signaling, or broadcast signaling.

In a possible implementation. Tmin is a preset value. Alternatively, the first terminal device obtains Tmin by using downlink control information, higher layer signaling, radio resource control signaling, or broadcast signaling.

According to a second aspect, an embodiment of this application provides a resource allocation method, including: determining, by a terminal device, a corresponding subcarrier set based on downlink control information sent by a base station; and determining, by the terminal device, a corresponding subcarrier group based on a physical cell identity PCID of a cell to which the terminal device belongs and a preset rule, where the subcarrier group corresponding to a first terminal device includes some subcarriers in the subcarrier set corresponding to the terminal device. It may be understood that the first cell may be any one of at least one cell. Therefore, terminal devices in different cells may determine corresponding subcarrier groups based on PCIDs of the cells in which the terminal devices are located and the preset rule, so that the terminal devices in the different cells can determine different subcarrier groups. This can reduce interference between neighboring cells.

In a possible implementation, the first terminal device corresponds to two candidate subcarrier groups when the subcarrier set corresponding to the first terminal device includes three consecutive subcarriers of one resource block, and the subcarrier group corresponding to the first terminal device includes two consecutive subcarriers in the subcarrier set, where a first candidate subcarrier group includes a first subcarrier and a second subcarrier in the subcarrier set, and a second candidate subcarrier group includes the second subcarrier and a third subcarrier in the subcarrier set.

In a possible implementation, the determining, by the base station based on a physical cell identity PCID of the first cell and a preset rule, a subcarrier group corresponding to the terminal device accessing the first cell includes: when M is an odd number, the first terminal device corresponds to the first candidate subcarrier group, and when M is an even number, the first terminal device corresponds to the second candidate subcarrier group, where M=PCID mod N, N is a positive integer, PCID is the PCID of the first cell, and mod is a modulo operation, or when M is an even number, the first terminal device corresponds to the first candidate subcarrier group, and when M is an odd number, the first terminal device corresponds to the second candidate subcarrier group, where M=PCID mod N. N is a positive integer. PCID is the PCID of the first cell, and mod is a modulo operation.

In a possible implementation, N is equal to 2 or 6.

According to a third aspect, an embodiment of this application provides a resource allocation method, including: notifying, by a base station, a subcarrier set corresponding to a first terminal device in a first cell; and determining, by the base station based on a physical cell identity PCID of the first cell and a preset rule, a subcarrier group corresponding to the first terminal device in the first cell, where the subcarrier group corresponding to the first terminal device includes some subcarriers in the subcarrier set corresponding to the terminal device. It may be understood that the first cell may be any one of at least one cell. Therefore, terminal devices in different cells may determine corresponding subcarrier groups based on PCIDs of the cells in which the terminal devices are located and the preset rule, so that the terminal devices in the different cells can determine different subcarrier groups. This can reduce interference between neighboring cells.

In a possible implementation, the first terminal device corresponds to two candidate subcarrier groups when the subcarrier set corresponding to the first terminal device includes three consecutive subcarriers of one resource block, and the subcarrier group corresponding to the first terminal device includes two consecutive subcarriers in the subcarrier set, where a first candidate subcarrier group includes a first subcarrier and a second subcarrier in the subcarrier set, and a second candidate subcarrier group includes the second subcarrier and a third subcarrier in the subcarrier set.

In a possible implementation, the determining, by the base station based on a physical cell identity PCID of the first cell and a preset rule, a subcarrier group corresponding to the terminal device accessing the first cell includes: when M is an odd number, the first terminal device corresponds to the first candidate subcarrier group, and when M is an even number, the first terminal device corresponds to the second candidate subcarrier group, where M=PCID mod N, N is a positive integer, PCID is the PCID of the first cell, and mod is a modulo operation, or when M is an even number, the first terminal device corresponds to the first candidate subcarrier group, and when M is an odd number, the first terminal device corresponds to the second candidate subcarrier group, where M=PCID mod N. N is a positive integer. PCID is the PCID of the first cell, and mod is a modulo operation.

In a possible implementation, N is equal to 2 or 6.

According to a fourth aspect, an embodiment of the present application provides a resource allocation method, including: determining, by a base station based on a physical cell identity PCID of a first cell and a preset rule, a subcarrier group corresponding to a first terminal device in the first cell, where the subcarrier group corresponding to the first terminal device includes some subcarriers in a subcarrier set corresponding to the first terminal device. It may be understood that the first cell may be any one of at least one cell. Therefore, terminal devices in different cells may determine corresponding subcarrier groups based on PCIDs of the cells in which the terminal devices are located and the preset rule, so that the terminal devices in the different cells can determine different subcarrier groups. This can reduce interference between neighboring cells.

In a possible implementation, the determining, by a base station based on a physical cell identity PCID of a first cell and a preset rule, a subcarrier group corresponding to a first terminal device accessing the first cell includes: determining, by the base station based on the PCID of the first cell, a subcarrier group corresponding to the first terminal device in each of at least one consecutive time interval (in each of one time interval or more than one consecutive time intervals) corresponding to the first cell.

In a possible implementation, there is an offset of R subcarriers or subcarrier groups between subcarrier groups corresponding to the first terminal device in adjacent time intervals in the at least one time interval, where R is an integer.

In a possible implementation, lengths of all time intervals in the at least one time interval are the same or different.

In a possible implementation, each of the at least one time interval corresponding to the first cell is the same as or different from each of at least one time interval corresponding to a second cell.

In a possible implementation, the first terminal device corresponds to at least two candidate subcarrier groups, and each candidate subcarrier group includes a plurality of consecutive subcarriers.

In a possible implementation, the first terminal device corresponds to two candidate subcarrier groups when the subcarrier set corresponding to the first terminal device includes three consecutive subcarriers of one resource block, and the subcarrier group corresponding to the first terminal device includes two consecutive subcarriers in the subcarrier set, where a first candidate subcarrier group includes a first subcarrier and a second subcarrier in the subcarrier set, and a second candidate subcarrier group includes the second subcarrier and a third subcarrier in the subcarrier set. Alternatively, the first terminal device corresponds to four candidate subcarrier groups when the subcarrier set corresponding to the first terminal device includes 12 consecutive subcarriers of one resource block, and the subcarrier group corresponding to the first terminal device includes three consecutive subcarriers in the subcarrier set, where a first candidate subcarrier group includes a first subcarrier to a third subcarrier in the subcarrier set, a second candidate subcarrier group includes a fourth subcarrier to a sixth subcarrier in the subcarrier set, a third candidate subcarrier group includes a seventh subcarrier to a ninth subcarrier in the subcarrier set, and a fourth candidate subcarrier group includes a tenth subcarrier to a twelfth subcarrier in the subcarrier set. Alternatively, the first terminal device corresponds to two candidate subcarrier groups when the subcarrier set corresponding to the first terminal device includes 12 consecutive subcarriers of one resource block, and the subcarrier group corresponding to the first terminal device includes six consecutive subcarriers in the subcarrier set, where a first candidate subcarrier group includes a first subcarrier to a sixth subcarrier in the subcarrier set, and a second candidate subcarrier group includes a seventh subcarrier to a twelfth subcarrier in the subcarrier set.

In a possible implementation, when the subcarrier set corresponding to the first terminal device includes three consecutive subcarriers of one resource block, and the subcarrier group corresponding to the first terminal device includes two consecutive subcarriers in the subcarrier set, the determining, by the base station based on the PCID of the first cell, a subcarrier group corresponding to the first terminal device in each of at least one consecutive time interval corresponding to the first cell includes: when M is an odd number, the first terminal device corresponds to the first candidate subcarrier group in an initial time interval in the at least one consecutive time interval corresponding to the first cell, and when M is an even number, the first terminal device corresponds to the second candidate subcarrier group in the initial time interval, where M=PCID mod N, N is a positive integer, PCID is the PCID of the first cell, and mod is a modulo operation; or when M is an even number, the first terminal device corresponds to the first candidate subcarrier group in an initial time interval in the at least one consecutive time interval corresponding to the first cell, and when M is an odd number, the first terminal device corresponds to the second candidate subcarrier group in the initial time interval, where M=PCID mod N, N is a positive integer, PCID is the PCID of the first cell, and mod is a modulo operation.

In a possible implementation, when the subcarrier set corresponding to the first terminal device includes three consecutive subcarriers of one resource block, and the subcarrier group corresponding to the first terminal device includes two consecutive subcarriers in the subcarrier set, each time interval T corresponding to the first cell=$(2^L)$ Tmin, where L=floor $\{(PCID \bmod N)/2\}$, floor is a round-down function, N is a positive integer, mod is a modulo operation, and Tmin is a time unit.

In a possible implementation, when the subcarrier set includes 12 consecutive subcarriers of one resource block, and the subcarrier group corresponding to the first terminal device includes three consecutive subcarriers or six consecutive subcarriers in the subcarrier set, each time interval T corresponding to the first cell=$(2^L)$ Imin, where L=(PCID mod N) N is a positive integer, PCID is the PCID of the first cell, mod is a modulo operation, and Tmin is a time unit.

In a possible implementation, R is a preset value. Alternatively, the base station notifies the first terminal device of R by using downlink control information, higher layer signaling, radio resource control signaling, or broadcast signaling.

In a possible implementation, the base station notifies the first terminal device of M by using downlink control information, higher layer signaling, radio resource control signaling, or broadcast signaling.

In a possible implementation, Tmin is a preset value. Alternatively, the base station notifies the first terminal device of Tmin by using downlink control information, higher layer signaling, radio resource control signaling, or broadcast signaling.

According to a fifth aspect, an embodiment of this application provides a first terminal device, including: a determining unit, configured to determine, based on a physical cell identity PCID of a first cell accessed by the first terminal device and a preset rule, a subcarrier group corresponding to the first terminal device, where the subcarrier group corresponding to the first terminal device includes some subcarriers in a subcarrier set corresponding to the first terminal device.

In a possible implementation, the determining unit is configured to determine, based on the PCID of the first cell, a subcarrier group corresponding to the first terminal device in each of at least one consecutive time interval corresponding to the first cell.

In a possible implementation, there is an offset of R subcarriers or subcarrier groups between subcarrier groups corresponding to the first terminal device in adjacent time intervals in the at least one time interval, where R is an integer.

In a possible implementation, lengths of all time intervals in the at least one time interval are the same or different.

In a possible implementation, each of the at least one time interval corresponding to the first cell is the same as or different from each of at least one time interval corresponding to a second cell.

In a possible implementation, the first terminal device corresponds to at least two candidate subcarrier groups, and each candidate subcarrier group includes a plurality of consecutive subcarriers.

In a possible implementation, the first terminal device corresponds to two candidate subcarrier groups when the subcarrier set corresponding to the first terminal device includes three consecutive subcarriers of one resource block, and the subcarrier group corresponding to the first terminal device includes two consecutive subcarriers in the subcarrier set, where a first candidate subcarrier group includes a first subcarrier and a second subcarrier in the subcarrier set, and a second candidate subcarrier group includes the second subcarrier and a third subcarrier in the subcarrier set. Alternatively, the first terminal device corresponds to four candidate subcarrier groups when the subcarrier set corresponding to the first terminal device includes 12 consecutive subcarriers of one resource block, and the subcarrier group corresponding to the first terminal device includes three consecutive subcarriers in the subcarrier set, where a first candidate subcarrier group includes a first subcarrier to a third subcarrier in the subcarrier set, a second candidate subcarrier group includes a fourth subcarrier to a sixth subcarrier in the subcarrier set, a third candidate subcarrier group includes a seventh subcarrier to a ninth subcarrier in the subcarrier set, and a fourth candidate subcarrier group includes a tenth subcarrier to a twelfth subcarrier in the subcarrier set. Alternatively, the first terminal device corresponds to two candidate subcarrier groups when the subcarrier set corresponding to the first terminal device includes 12 consecutive subcarriers of one resource block, and the subcarrier group corresponding to the first terminal device includes six consecutive subcarriers in the subcarrier set, where a first candidate subcarrier group includes a first subcarrier to a sixth subcarrier in the subcarrier set, and a second candidate subcarrier group includes a seventh subcarrier to a twelfth subcarrier in the subcarrier set.

In a possible implementation, when the subcarrier set corresponding to the first terminal device includes three consecutive subcarriers of one resource block, and the subcarrier group corresponding to the first terminal device includes two consecutive subcarriers in the subcarrier set, the determining, by the first terminal device based on the PCID of the first cell, a subcarrier group corresponding to the first terminal device in each of at least one consecutive time interval corresponding to the first cell includes: when M is an odd number, the first terminal device corresponds to the first candidate subcarrier group in an initial time interval in the at least one consecutive time interval corresponding to the first cell, and when M is an even number, the first terminal device corresponds to the second candidate subcarrier group in the initial time interval, where M=PCID mod N, N is a positive integer, PCID is the PCID of the first cell, and mod is a modulo operation; or when M is an even number, the first terminal device corresponds to the first candidate subcarrier group in an initial time interval in the at least one consecutive time interval corresponding to the first cell, and when M is an odd number, the first terminal device corresponds to the second candidate subcarrier group in the initial time interval, where M=PCID mod N, N is a positive integer, PCID is the PCID of the first cell, and mod is a modulo operation.

In a possible implementation, when the subcarrier set corresponding to the first terminal device includes three consecutive subcarriers of one resource block, and the subcarrier group corresponding to the first terminal device includes two consecutive subcarriers in the subcarrier set, each time interval T corresponding to the first cell=$(2^L)$ Tmin, where L=floor {(PCID mod N)/2}, floor is a round-down function. N is a positive integer, mod is a modulo operation, and Tmin is a time unit.

In a possible implementation, when the subcarrier set includes 12 consecutive subcarriers of one resource block, and the subcarrier group corresponding to the first terminal device includes three consecutive subcarriers or six consecutive subcarriers in the subcarrier set, each time interval T corresponding to the first cell=$(2^L)$ Tmin, where L=(PCID mod N), N is a positive integer, PCID is the PCID of the first cell, mod is a modulo operation, and Tmin is a time unit.

In a possible implementation, R is a preset value. Alternatively, the first terminal device obtains R by using downlink control information, higher layer signaling, radio resource control signaling, or broadcast signaling.

In a possible implementation, the first terminal device obtains M by using downlink control information, higher layer signaling, radio resource control signaling, or broadcast signaling.

In a possible implementation. Tmin is a preset value. Alternatively, the first terminal device obtains Tmin by using downlink control information, higher layer signaling, radio resource control signaling, or broadcast signaling.

According to a sixth aspect, an embodiment of this application provides a terminal device, including a determining unit, configured to determine a corresponding subcarrier set based on downlink control information sent by a base station. The determining unit is further configured to determine a corresponding subcarrier group based on a physical cell identity PCID of a cell to which the terminal device belongs and a preset rule, where the subcarrier group corresponding to the first terminal device includes some subcarriers in the subcarrier set corresponding to the terminal device.

In a possible implementation, the first terminal device corresponds to two candidate subcarrier groups when the subcarrier set corresponding to the first terminal device includes three consecutive subcarriers of one resource block, and the subcarrier group corresponding to the first terminal device includes two consecutive subcarriers in the subcarrier set, where a first candidate subcarrier group includes a first subcarrier and a second subcarrier in the subcarrier set, and a second candidate subcarrier group includes the second subcarrier and a third subcarrier in the subcarrier set.

In a possible implementation, the determining, by the base station based on a physical cell identity PCID of the first cell and a preset rule, a subcarrier group corresponding to the terminal device accessing the first cell includes: when M is an odd number, the first terminal device corresponds to the first candidate subcarrier group, and when M is an even number, the first terminal device corresponds to the second candidate subcarrier group, where M=PCID mod N, N is a positive integer, PCID is the PCID of the first cell, and mod is a modulo operation; or when M is an even number, the first terminal device corresponds to the first candidate subcarrier group, and when M is an odd number, the first terminal device corresponds to the second candidate subcarrier group, where M=PCID mod N, N is a positive integer, PCID is the PCID of the first cell, and mod is a modulo operation.

In a possible implementation, N is equal to 2 or 6.

According to a seventh aspect, an embodiment of this application provides a base station, including a notification unit, configured to notify a subcarrier set corresponding to a first terminal device in a first cell; and a determining unit, configured to determine, based on a physical cell identity PCID of the first cell and a preset rule, a subcarrier group corresponding to the first terminal device in the first cell, where the subcarrier group corresponding to the first terminal device includes some subcarriers in the subcarrier set corresponding to the terminal device.

In a possible implementation, the first terminal device corresponds to two candidate subcarrier groups when the subcarrier set corresponding to the first terminal device includes three consecutive subcarriers of one resource block, and the subcarrier group corresponding to the first terminal device includes two consecutive subcarriers in the subcarrier set, where a first candidate subcarrier group includes a first subcarrier and a second subcarrier in the subcarrier set, and a second candidate subcarrier group includes the second subcarrier and a third subcarrier in the subcarrier set.

In a possible implementation, the determining, by the base station based on a physical cell identity PCID of the first cell and a preset rule, a subcarrier group corresponding to the terminal device accessing the first cell includes: when M is an odd number, the first terminal device corresponds to the first candidate subcarrier group, and when M is an even number, the first terminal device corresponds to the second candidate subcarrier group, where M=PCID mod N, N is a positive integer, PCID is the PCID of the first cell, and mod is a modulo operation; or when M is an even number, the first terminal device corresponds to the first candidate subcarrier group, and when M is an odd number, the first terminal device corresponds to the second candidate subcarrier group, where M=PCID mod N, N is a positive integer, PCID is the PCID of the first cell, and mod is a modulo operation.

In a possible implementation, N is equal to 2 or 6.

According to an eighth aspect, an embodiment of the present application provides a base station, including a determining unit, configured to determine, based on a physical cell identity PCID of a first cell and a preset rule, a subcarrier group corresponding to a first terminal device in the first cell, where the subcarrier group corresponding to the first terminal device includes some subcarriers in a subcarrier set corresponding to the first terminal device.

In a possible implementation, the determining unit is configured to determine, based on the PCID of the first cell, a subcarrier group corresponding to the first terminal device in each of at least one consecutive time interval corresponding to the first cell.

In a possible implementation, there is an offset of R subcarriers or subcarrier groups between subcarrier groups corresponding to the first terminal device in adjacent time intervals in the at least one time interval, where R is an integer.

In a possible implementation, lengths of all time intervals in the at least one time interval are the same or different.

In a possible implementation, each of the at least one time interval corresponding to the first cell is the same as or different from each of at least one time interval corresponding to a second cell.

In a possible implementation, the first terminal device corresponds to at least two candidate subcarrier groups, and each candidate subcarrier group includes a plurality of consecutive subcarriers.

In a possible implementation, the first terminal device corresponds to two candidate subcarrier groups when the subcarrier set corresponding to the first terminal device includes three consecutive subcarriers of one resource block, and the subcarrier group corresponding to the first terminal device includes two consecutive subcarriers in the subcarrier set, where a first candidate subcarrier group includes a first subcarrier and a second subcarrier in the subcarrier set, and a second candidate subcarrier group includes the second subcarrier and a third subcarrier in the subcarrier set. Alternatively, the first terminal device corresponds to four candidate subcarrier groups when the subcarrier set corresponding to the first terminal device includes 12 consecutive subcarriers of one resource block, and the subcarrier group corresponding to the first terminal device includes three consecutive subcarriers in the subcarrier set, where a first candidate subcarrier group includes a first subcarrier to a third subcarrier in the subcarrier set, a second candidate subcarrier group includes a fourth subcarrier to a sixth subcarrier in the subcarrier set, a third candidate subcarrier group includes a seventh subcarrier to a ninth subcarrier in the subcarrier set, and a fourth candidate subcarrier group includes a tenth subcarrier to a twelfth subcarrier in the subcarrier set. Alternatively, the first terminal device corresponds to two candidate subcarrier groups when the subcarrier set corresponding to the first terminal device includes 12 consecutive subcarriers of one resource block, and the subcarrier group corresponding to the first terminal device includes six consecutive subcarriers in the subcarrier set, where a first candidate subcarrier group includes a first subcarrier to a sixth subcarrier in the subcarrier set, and a second candidate subcarrier group includes a seventh subcarrier to a twelfth subcarrier in the subcarrier set.

In a possible implementation, when the subcarrier set corresponding to the first terminal device includes three consecutive subcarriers of one resource block, and the subcarrier group corresponding to the first terminal device includes two consecutive subcarriers in the subcarrier set, the determining, by the base station based on the PCID of the first cell, a subcarrier group corresponding to the first terminal device in each of at least one consecutive time interval corresponding to the first cell includes: when M is an odd number, the first terminal device corresponds to the first candidate subcarrier group in an initial time interval in the at least one consecutive time interval corresponding to the first cell, and when M is an even number, the first terminal device corresponds to the second candidate subcarrier group in the initial time interval, where M=PCID mod N, N is a positive integer, PCID is the PCID of the first cell, and mod is a modulo operation; or when M is an even number, the first terminal device corresponds to the first candidate subcarrier group in an initial time interval in the at least one consecutive time interval corresponding to the first cell, and when M is an odd number, the first terminal device corresponds to the second candidate subcarrier group in the initial time interval, where M=PCID mod N, N is a positive integer, PCID is the PCID of the first cell, and mod is a modulo operation.

In a possible implementation, when the subcarrier set corresponding to the first terminal device includes three consecutive subcarriers of one resource block, and the subcarrier group corresponding to the first terminal device includes two consecutive subcarriers in the subcarrier set, each time interval T corresponding to the first cell=($2^L$) Tmin, where L=floor {(PCID mod N)/2}, floor is a round-down function, N is a positive integer, mod is a modulo operation, and Tmin is a time unit.

In a possible implementation, when the subcarrier set includes 12 consecutive subcarriers of one resource block, and the subcarrier group corresponding to the first terminal device includes three consecutive subcarriers or six consecutive subcarriers in the subcarrier set, each time interval T corresponding to the first cell=($2^L$) Tmin, where L=(PCID mod N), N is a positive integer, PCID is the PCID of the first cell mod is a modulo operation, and Tmin is a time unit.

In a possible implementation, R is a preset value. Alternatively, the base station notifies the first terminal device of R by using downlink control information, higher layer signaling, radio resource control signaling, or broadcast signaling.

In a possible implementation, the base station notifies the first terminal device of M by using downlink control information, higher layer signaling, radio resource control signaling, or broadcast signaling.

In a possible implementation, Tmin is a preset value. Alternatively, the base station notifies the first terminal device of Tmin by using downlink control information, higher layer signaling, radio resource control signaling, or broadcast signaling.

According to a ninth aspect, an embodiment of this application provides a first terminal device, including: a determining unit, configured to determine, based on a physical cell identity PCID of a first cell accessed by the first terminal device and a preset rule, a subcarrier group corresponding to the first terminal device, where the subcarrier group corresponding to the first terminal device includes some subcarriers in a subcarrier set corresponding to the first terminal device.

In a possible implementation, the determining unit is configured to determine, based on the PCID of the first cell, a subcarrier group corresponding to the first terminal device in each of at least one consecutive time interval corresponding to the first cell.

In a possible implementation, there is an offset of R subcarriers or subcarrier groups between subcarrier groups corresponding to the first terminal device in adjacent time intervals in the at least one time interval, where R is an integer.

In a possible implementation, lengths of all time intervals in the at least one time interval are the same or different.

In a possible implementation, each of the at least one time interval corresponding to the first cell is the same as or different from each of at least one time interval corresponding to a second cell.

In a possible implementation, the first terminal device corresponds to at least two candidate subcarrier groups, and each candidate subcarrier group includes a plurality of consecutive subcarriers.

In a possible implementation, the first terminal device corresponds to two candidate subcarrier groups when the subcarrier set corresponding to the first terminal device includes three consecutive subcarriers of one resource block, and the subcarrier group corresponding to the first terminal device includes two consecutive subcarriers in the subcarrier set, where a first candidate subcarrier group includes a first subcarrier and a second subcarrier in the subcarrier set, and a second candidate subcarrier group includes the second subcarrier and a third subcarrier in the subcarrier set. Alternatively, the first terminal device corresponds to four candidate subcarrier groups when the subcarrier set corresponding to the first terminal device includes 12 consecutive subcarriers of one resource block, and the subcarrier group corresponding to the first terminal device includes three consecutive subcarriers in the subcarrier set, where a first candidate subcarrier group includes a first subcarrier to a third subcarrier in the subcarrier set, a second candidate subcarrier group includes a fourth subcarrier to a sixth subcarrier in the subcarrier set, a third candidate subcarrier group includes a seventh subcarrier to a ninth subcarrier in the subcarrier set, and a fourth candidate subcarrier group includes a tenth subcarrier to a twelfth subcarrier in the subcarrier set. Alternatively, the first terminal device corresponds to two candidate subcarrier groups when the subcarrier set corresponding to the first terminal device includes 12 consecutive subcarriers of one resource block, and the subcarrier group corresponding to the first terminal device includes six consecutive subcarriers in the subcarrier set, where a first candidate subcarrier group includes a first subcarrier to a sixth subcarrier in the subcarrier set, and a second candidate subcarrier group includes a seventh subcarrier to a twelfth subcarrier in the subcarrier set.

In a possible implementation, when the subcarrier set corresponding to the first terminal device includes three consecutive subcarriers of one resource block, and the subcarrier group corresponding to the first terminal device includes two consecutive subcarriers in the subcarrier set, the determining, by the first terminal device based on the PCID of the first cell, a subcarrier group corresponding to the first terminal device in each of at least one consecutive time interval corresponding to the first cell includes: when M is an odd number, the first terminal device corresponds to the first candidate subcarrier group in an initial time interval in the at least one consecutive time interval corresponding to the first cell, and when M is an even number, the first terminal device corresponds to the second candidate subcarrier group in the initial time interval, where M=PCID mod N, N is a positive integer, PCID is the PCID of the first cell, and mod is a modulo operation; or when M is an even number, the first terminal device corresponds to the first candidate subcarrier group in an initial time interval in the at least one consecutive time interval corresponding to the first cell, and when M is an odd number, the first terminal device corresponds to the second candidate subcarrier group in the initial time interval, where M=PCID mod N, N is a positive integer, PCID is the PCID of the first cell, and mod is a modulo operation.

In a possible implementation, when the subcarrier set corresponding to the first terminal device includes three consecutive subcarriers of one resource block, and the subcarrier group corresponding to the first terminal device includes two consecutive subcarriers in the subcarrier set, each time interval T corresponding to the first cell=($2^L$) Tmin, where L=floor {(PCID mod N)/2}, floor is a round-down function, N is a positive integer, mod is a modulo operation, and Tmin is a time unit.

In a possible implementation, when the subcarrier set includes 12 consecutive subcarriers of one resource block, and the subcarrier group corresponding to the first terminal device includes three consecutive subcarriers or six consecutive subcarriers in the subcarrier set, each time interval T corresponding to the first cell=($2^L$) Tmin, where L=(PCID mod N), N is a positive integer, PCID is the PCID of the first cell, mod is a modulo operation, and Tmin is a time unit.

In a possible implementation, R is a preset value. Alternatively, the first terminal device obtains R by using downlink control information, higher layer signaling, radio resource control signaling, or broadcast signaling.

In a possible implementation, the first terminal device obtains M by using downlink control information, higher layer signaling, radio resource control signaling, or broadcast signaling.

In a possible implementation, Tmin is a preset value. Alternatively, the first terminal device obtains Tmin by using downlink control information, higher layer signaling, radio resource control signaling, or broadcast signaling.

According to a tenth aspect, an embodiment of this application provides a terminal device, including a determining unit, configured to determine a corresponding subcarrier set based on downlink control information sent by a base station. The determining unit is further configured to determine a corresponding subcarrier group based on a physical cell identity PCID of a cell to which the terminal device belongs and a preset rule, where the subcarrier group corresponding to the first terminal device includes some subcarriers in the subcarrier set corresponding to the terminal device.

In a possible implementation, the first terminal device corresponds to two candidate subcarrier groups when the subcarrier set corresponding to the first terminal device includes three consecutive subcarriers of one resource block, and the subcarrier group corresponding to the first terminal device includes two consecutive subcarriers in the subcarrier set, where a first candidate subcarrier group includes a first subcarrier and a second subcarrier in the subcarrier set, and a second candidate subcarrier group includes the second subcarrier and a third subcarrier in the subcarrier set.

In a possible implementation, the determining, by the base station based on a physical cell identity PCID of the first cell and a preset rule, a subcarrier group corresponding to the terminal device accessing the first cell includes: when M is an odd number, the first terminal device corresponds to the first candidate subcarrier group, and when M is an even number, the first terminal device corresponds to the second candidate subcarrier group, where M=PCID mod N, N is a positive integer, PCID is the PCID of the first cell, and mod is a modulo operation; or when M is an even number, the first terminal device corresponds to the first candidate subcarrier group, and when M is an odd number, the first terminal device corresponds to the second candidate subcarrier group, where M=PCID mod N, N is a positive integer, PCID is the PCID of the first cell, and mod is a modulo operation.

In a possible implementation, N is equal to 2 or 6.

According to an eleventh aspect, an embodiment of this application provides a base station, including a notification unit, configured to notify a subcarrier set corresponding to a first terminal device in a first cell; and a determining unit, configured to determine, based on a physical cell identity PCID of the first cell and a preset rule, a subcarrier group corresponding to the first terminal device in the first cell, where the subcarrier group corresponding to the first terminal device includes some subcarriers in the subcarrier set corresponding to the terminal device.

In a possible implementation, the first terminal device corresponds to two candidate subcarrier groups when the subcarrier set corresponding to the first terminal device includes three consecutive subcarriers of one resource block, and the subcarrier group corresponding to the first terminal device includes two consecutive subcarriers in the subcarrier set, where a first candidate subcarrier group includes a first subcarrier and a second subcarrier in the subcarrier set, and a second candidate subcarrier group includes the second subcarrier and a third subcarrier in the subcarrier set.

In a possible implementation, the determining, by the base station based on a physical cell identity PCID of the first cell and a preset rule, a subcarrier group corresponding to the terminal device accessing the first cell includes: when M is an odd number, the first terminal device corresponds to the first candidate subcarrier group, and when M is an even number, the first terminal device corresponds to the second candidate subcarrier group, where M=PCID mod N, N is a positive integer, PCID is the PCID of the first cell, and mod is a modulo operation; or when M is an even number, the first terminal device corresponds to the first candidate subcarrier group, and when M is an odd number, the first terminal device corresponds to the second candidate subcarrier group, where M=PCID mod N, N is a positive integer, PCID is the PCID of the first cell, and mod is a modulo operation.

In a possible implementation, N is equal to 2 or 6.

According to a twelfth aspect, an embodiment of the present application provides a base station, including a determining unit, configured to determine, based on a physical cell identity PCID of a first cell and a preset rule, a subcarrier group corresponding to a first terminal device in the first cell, where the subcarrier group corresponding to the first terminal device includes some subcarriers in a subcarrier set corresponding to the first terminal device.

In a possible implementation, the determining unit is configured to determine, based on the PCID of the first cell, a subcarrier group corresponding to the first terminal device in each of at least one consecutive time interval corresponding to the first cell.

In a possible implementation, there is an offset of R subcarriers or subcarrier groups between subcarrier groups corresponding to the first terminal device in adjacent time intervals in the at least one time interval, where R is an integer.

In a possible implementation, lengths of all time intervals in the at least one time interval are the same or different.

In a possible implementation, each of the at least one time interval corresponding to the first cell is the same as or different from each of at least one time interval corresponding to a second cell.

In a possible implementation, the first terminal device corresponds to at least two candidate subcarrier groups, and each candidate subcarrier group includes a plurality of consecutive subcarriers.

In a possible implementation, the first terminal device corresponds to two candidate subcarrier groups when the subcarrier set corresponding to the first terminal device includes three consecutive subcarriers of one resource block, and the subcarrier group corresponding to the first terminal device includes two consecutive subcarriers in the subcarrier set, where a first candidate subcarrier group includes a first subcarrier and a second subcarrier in the subcarrier set, and a second candidate subcarrier group includes the second subcarrier and a third subcarrier in the subcarrier set. Alternatively, the first terminal device corresponds to four candidate subcarrier groups when the subcarrier set corresponding to the first terminal device includes 12 consecutive subcarriers of one resource block, and the subcarrier group corresponding to the first terminal device includes three consecutive subcarriers in the subcarrier set, where a first candidate subcarrier group includes a first subcarrier to a third subcarrier in the subcarrier set, a second candidate subcarrier group includes a fourth subcarrier to a sixth subcarrier in the subcarrier set, a third candidate subcarrier group includes a seventh subcarrier to a ninth subcarrier in the subcarrier set, and a fourth candidate subcarrier group includes a tenth subcarrier to a twelfth subcarrier in the subcarrier set. Alternatively, the first terminal device corresponds to two candidate subcarrier groups when the subcarrier set corresponding to the first terminal device includes 12 consecutive subcarriers of one resource block, and the subcarrier group corresponding to the first terminal device includes six consecutive subcarriers in the subcarrier set, where a first candidate subcarrier group includes a first subcarrier to a sixth subcarrier in the subcarrier set, and a second candidate subcarrier group includes a seventh subcarrier to a twelfth subcarrier in the subcarrier set.

In a possible implementation, when the subcarrier set corresponding to the first terminal device includes three consecutive subcarriers of one resource block, and the subcarrier group corresponding to the first terminal device includes two consecutive subcarriers in the subcarrier set, the determining, by the base station based on the PCID of the first cell, a subcarrier group corresponding to the first terminal device in each of at least one consecutive time interval corresponding to the first cell includes: when M is an odd number, the first terminal device corresponds to the first candidate subcarrier group in an initial time interval in the at least one consecutive time interval corresponding to the first cell, and when M is an even number, the first terminal device corresponds to the second candidate subcarrier group in the initial time interval, where M=PCID mod N, N is a positive integer, PCID is the PCID of the first cell, and mod is a modulo operation; or when M is an even number, the first terminal device corresponds to the first candidate subcarrier group in an initial time interval in the at least one consecutive time interval corresponding to the first cell, and when M is an odd number, the first terminal device corresponds to the second candidate subcarrier group in the initial time interval, where M=PCID mod N, N is a positive integer, PCID is the PCID of the first cell, and mod is a modulo operation.

In a possible implementation, when the subcarrier set corresponding to the first terminal device includes three consecutive subcarriers of one resource block, and the subcarrier group corresponding to the first terminal device includes two consecutive subcarriers in the subcarrier set, each time interval T corresponding to the first cell=$(2^L)$ Tmin, where L=floor {(PCID mod N)/2}, floor is a round-down function, N is a positive integer, mod is a modulo operation, and Tmin is a time unit.

In a possible implementation, when the subcarrier set includes 12 consecutive subcarriers of one resource block, and the subcarrier group corresponding to the first terminal device includes three consecutive subcarriers or six consecutive subcarriers in the subcarrier set, each time interval T corresponding to the first cell=$(2^L)$ Imin, where L=(PCID mod N) N is a positive integer, PCID is the PCID of the first cell, mod is a modulo operation, and Tmin is a time unit.

In a possible implementation, R is a preset value. Alternatively, the base station notifies the first terminal device of R by using downlink control information, higher layer signaling, radio resource control signaling, or broadcast signaling.

In a possible implementation, the base station notifies the first terminal device of M by using downlink control information, higher layer signaling, radio resource control signaling, or broadcast signaling.

In a possible implementation, Tmin is a preset value. Alternatively, the base station notifies the first terminal device of Tmin by using downlink control information, higher layer signaling, radio resource control signaling, or broadcast signaling.

According to a thirteenth aspect, an embodiment of the present application provides an apparatus, where the apparatus exists in a product form of a chip, and a structure of the apparatus includes a determining unit and a memory. The memory is configured to couple to the determining unit, and store a program instruction and data that are necessary for the apparatus. The determining unit is configured to execute the program instruction stored in the memory, so that the apparatus performs functions of the terminal device in the foregoing methods.

According to a fourteenth aspect, an embodiment of the present application provides an apparatus, where the apparatus exists in a product form of a chip, and a structure of the apparatus includes a determining unit and a memory. The memory is configured to couple to the determining unit, and store a program instruction and data that are necessary for the apparatus. The determining unit is configured to execute the program instruction stored in the memory, so that the apparatus performs functions of the base station in the foregoing methods.

DESCRIPTION OF EMBODIMENTS

Technical solutions provided in this application may be applied to various communications systems that can support sub-PRB resource allocation. For example, this application may be applied to a long term evolution (LTE) system or a long term evolution-advanced (LTE-A) system. There may be a plurality of application scenarios, for example, scenarios such as machine to machine M2M), D2M, macro-micro communication, enhanced mobile broadband (eMBB), ultra-reliable low-latency communications (uRLLC), and massive machine-type communications (mMTC). These scenarios may include but are not limited to a scenario of communication between a terminal and another terminal, a scenario of communication between a base station and another base station, a scenario of communication between a base station and a terminal, and the like. The technical solutions provided in the embodiments of this application may also be applied to a scenario in a 5th generation mobile communication technology (5G) communications system, such as communication between a terminal and another terminal or communication between a base station and another base station.

Figure 1:
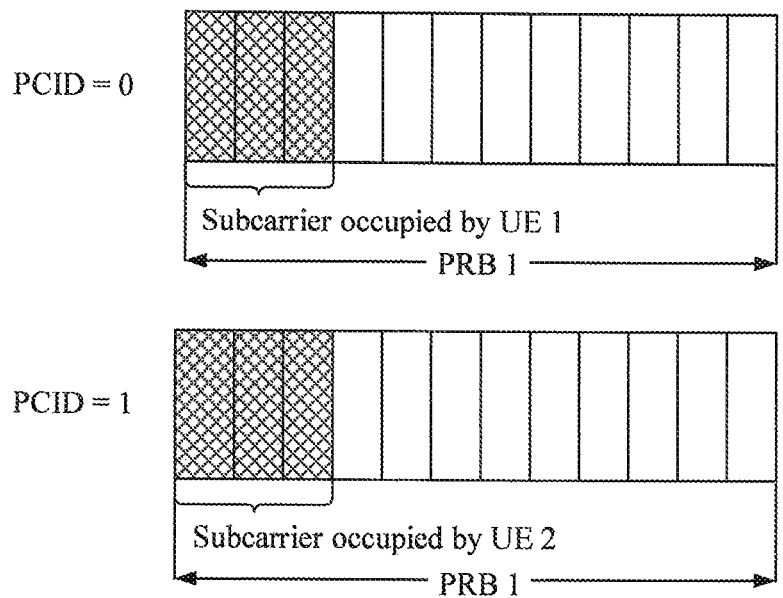
FIG. 1 is a schematic diagram of resource interference between neighboring cells.
Figure 2:
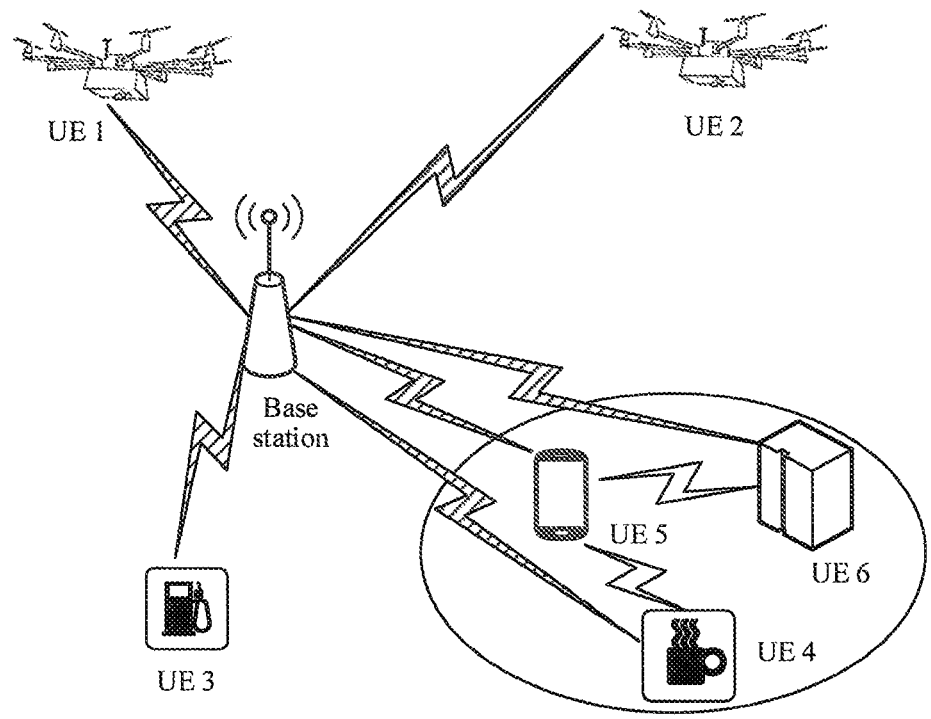
FIG. 2 is a schematic architectural diagram of a communications system according to an embodiment of this application.

A system architecture in the embodiments of this application may include a base station and a terminal device. The base station may be a base station, and the terminal device may be UE. For example, as shown in FIG. 2, a system architecture in an embodiment of this application includes a base station and a plurality of different types of UEs (for example, UE 1 to UE 6). The UE 1 and the UE 2 may be unmanned aerial vehicles, the UE 3 may be a smart fuel dispenser, the UE 4 may be a smart coffee machine, the UE 5 may be a mobile phone, and the UE 6 may be a smart printer. The UE 1 to the UE 6 may send uplink data to the base station, and the base station may receive the uplink data sent by the UE 1 to the UE 6. In a possible implementation, a system architecture in this embodiment of this application may include UE 4, UE 5, and UE 6. In the communications system, the UE 4 and the UE 6 may send uplink data to the UE 5, and the UE 5 may receive the uplink data sent by the UE 4 and the UE 6.

The base station may be a device that can communicate with the terminal device. The base station may be a relay station, an access point, or the like. The base station may be a base transceiver station (BTS) in a global system for mobile communications (GSM) or a code division multiple access (CDMA) network, or may be an NB (NodeB) in wideband code division multiple access (WCDMA), or may be an eNB or an eNodeB (evolutional NodeB) in LTE. Alternatively, the base station may be a radio controller in a cloud radio access network (CRAN) scenario. Alternatively, the base station may be a base station in a 5G network or a base station in a future evolved network, or may be a wearable device, a vehicle-mounted device, or the like.

The terminal device may be a user equipment (UE) that provides voice and/or other service data connectivity for a user, or a handheld device with a wireless connection function, or another processing device connected to a wireless modem. The wireless terminal may be a portable, pocket-sized, computer built-in, or in-vehicle mobile apparatus, or may be a device such as a personal communications service (PCS) phone, a cordless phone, a session initiation protocol (SIP) phone, a wireless local loop (WLL) station, or a personal digital assistant (PDA). This is not limited herein. A wired terminal can communicate with an access network device and a core network device through an aerial electrical line and cable engineering (including an aerial, underground, and underwater cable, an optical cable, and the like). Wired terminals include a wired telephone, a cable television, a broadband computer, and the like. The wired telephone includes a home landline telephone or an enterprise landline telephone. The cable television includes a community antenna television (CATV) system, an internet protocol television (IPTV), an internet television, and the like.

Figure 3:
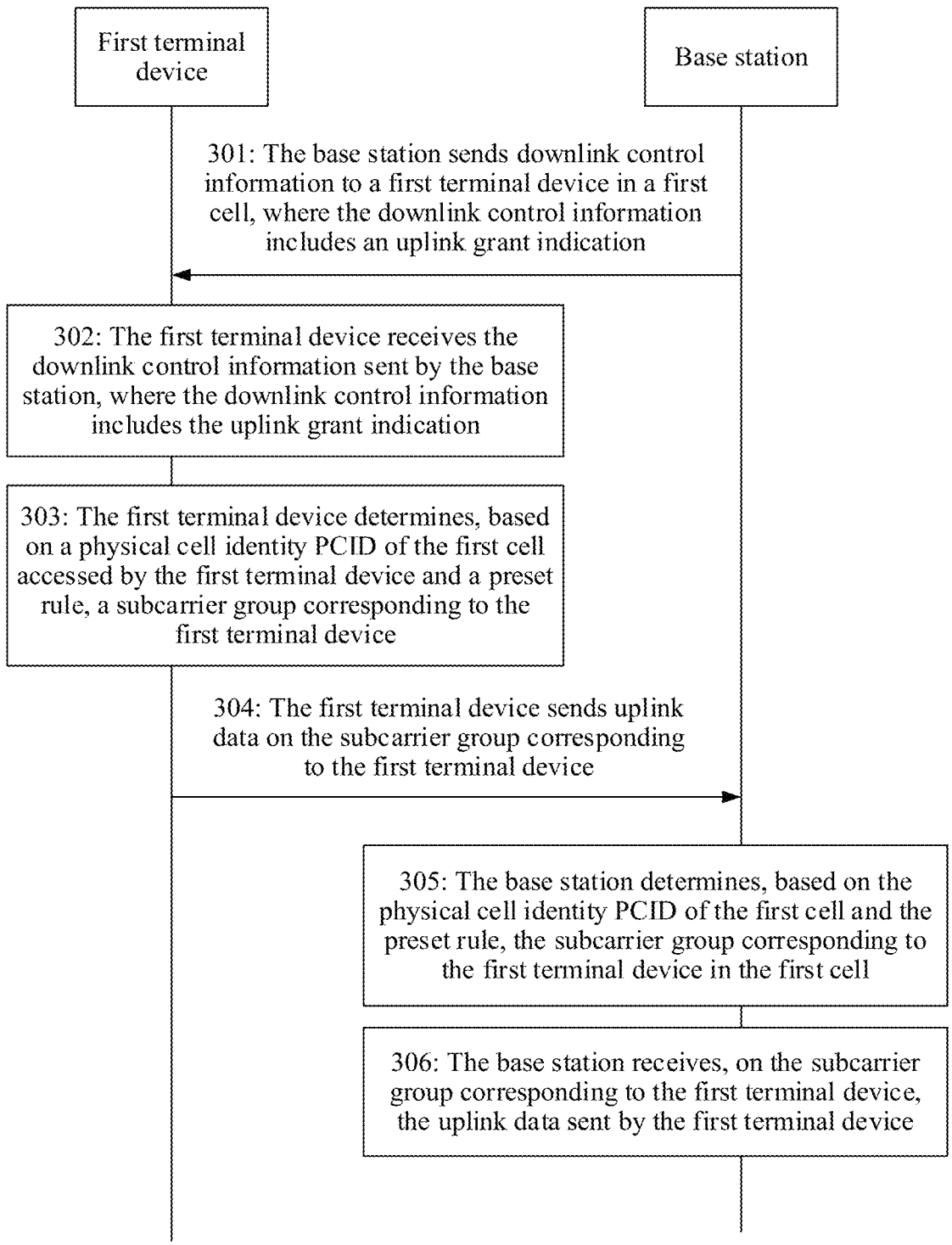
FIG. 3 is a schematic diagram of signal interaction in a resource allocation method according to an embodiment of this application.

An embodiment of this application provides a resource allocation method. An example in which a subcarrier set corresponding to a first terminal device includes three consecutive subcarriers of one resource block, and a subcarrier group corresponding to the first terminal device includes two consecutive subcarriers in the subcarrier set is used for description. As shown in FIG. 3, the method includes the following steps.

301: A base station sends downlink control information to a first terminal device in a first cell, where the downlink control information includes an uplink grant indication.

The uplink grant indication may be used to indicate a subcarrier set corresponding to the first terminal device in the first cell. The subcarrier set includes all or some consecutive subcarriers of one resource block, and a subcarrier group includes some consecutive subcarriers in the subcarrier set.

Figure 4:
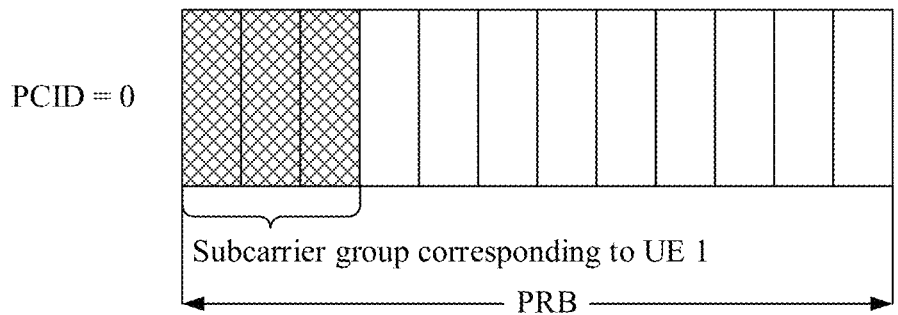
FIG. 4 is a schematic diagram of a subcarrier group that is in a subcarrier set and that corresponds to a first terminal device according to an embodiment of this application.

For example, as shown in FIG. 4, assuming that a PCID of the first cell is 0, and the first terminal device is UE 1, a subcarrier set corresponding to the UE 1 may include some subcarriers of one resource block, for example, include a first subcarrier to a third subcarrier of the resource block. The subcarrier group corresponding to the first terminal device in the first cell may include two consecutive subcarriers in the subcarrier set.

It should be noted that the first terminal device corresponds to at least two candidate subcarrier groups, and each candidate subcarrier group includes a plurality of consecutive subcarriers. The first terminal device corresponds to two candidate subcarrier groups when the subcarrier set corresponding to the first terminal device includes three consecutive subcarriers of one resource block, and the subcarrier group corresponding to the first terminal device includes two consecutive subcarriers in the subcarrier set, where a first candidate subcarrier group includes a first subcarrier and a second subcarrier in the subcarrier set, and a second candidate subcarrier group includes the second subcarrier and a third subcarrier in the subcarrier set.

It should be noted that the subcarrier group corresponding to the first terminal device may be offset between the two candidate subcarrier groups corresponding to the first terminal device. For example, the subcarrier group corresponding to the first terminal device may be offset by one subcarrier in the subcarrier set each time. Specifically, the subcarrier group corresponding to the first terminal device may be offset from the first candidate subcarrier group to the second candidate subcarrier group, or may be offset from the second candidate subcarrier group to the first candidate subcarrier group. To be specific, the subcarrier group corresponding to the first terminal device may be offset from the first subcarrier and the second subcarrier in the subcarrier set to the second subcarrier and the third subcarrier, or may be offset from the second subcarrier and the third subcarrier in the subcarrier set to the first subcarrier and the second subcarrier.

In a possible implementation, the uplink grant indication may further include a modulation and coding scheme and the like used by the first terminal device to transmit data. The uplink grant indication may be configured in a random access response or higher layer signaling. This is not limited in this application.

302: The first terminal device receives the downlink control information sent by the base station, where the downlink control information includes the uplink grant indication.

For related description of the uplink grant indication, refer to step 301. Details are not described herein.

303: The first terminal device determines, based on the physical cell identity PCID of the first cell accessed by the first terminal device and a preset rule, a subcarrier group corresponding to the first terminal device, where the subcarrier group corresponding to the first terminal device includes some consecutive subcarriers in the subcarrier set corresponding to the first terminal device.

In a possible implementation, the first terminal device determines, based on the PCID of the first cell, a subcarrier group corresponding to the first terminal device in each of at least one consecutive time interval corresponding to the first cell.

For example, when the subcarrier set corresponding to the first terminal device includes three consecutive subcarriers of one resource block, and the subcarrier group corresponding to the first terminal device includes two consecutive subcarriers in the subcarrier set, the first terminal device may first determine a value of M, where M=PCID mod N. The physical cell identity PCID is the PCID of the first cell, mod is a modulo operation, N is a positive integer, and a value of N may be a fixed value, for example, 2 or 6.

In a possible implementation, when M is an odd number, the first terminal device corresponds to the first candidate subcarrier group in an initial time interval in the at least one consecutive time interval corresponding to the first cell, and when M is an even number, the first terminal device corresponds to the second candidate subcarrier group in the initial time interval.

In a possible implementation, when M is an even number, the first terminal device corresponds to the first candidate subcarrier group in an initial time interval in the at least one consecutive time interval corresponding to the first cell, and when M is an odd number, the first terminal device corresponds to the second candidate subcarrier group in the initial time interval.

In a possible implementation, the first terminal device may obtain the value of N by using downlink control information, higher layer signaling, radio resource control signaling, or broadcast signaling.

It may be understood that the first terminal device accessing the first cell may be any terminal device accessing the first cell. In other words, a subcarrier group corresponding to each terminal device accessing the first cell occupies both a first subcarrier and a second subcarrier in a subcarrier set corresponding to the terminal device, or occupies both a second subcarrier and a third subcarrier, which may meet a related stipulation in a standard. It should be noted that subcarrier sets corresponding to terminal devices accessing the first cell are different.

In addition, it may be understood that the first cell may be any one of at least one cell. When one of the at least one cell is a local cell, a value of M obtained by a terminal device accessing the local cell may be different from a value of M obtained by a terminal device accessing a neighboring cell of the local cell. This is because a PCID of the local cell is different from that of the neighboring cell. When the terminal device accessing the local cell and the terminal device accessing the neighboring cell correspond to a same subcarrier set, the terminal device accessing the local cell and the terminal device accessing the neighboring cell may correspond to different subcarrier groups in the subcarrier set. Therefore, interference between neighboring cells can be reduced.

Figure 5:
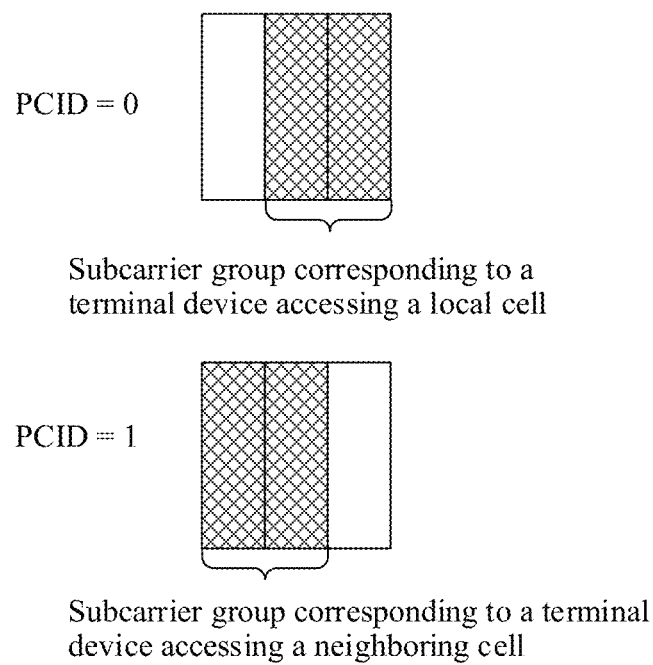
FIG. 5 is a schematic diagram of a subcarrier group that is in a subcarrier set and that corresponds to a terminal device according to an embodiment of this application.

For example, as shown in FIG. 5, assuming that a PCID of the local cell is 0 and a PCID of the neighboring cell is 1, when the terminal device accessing the local cell and the terminal device accessing the neighboring cell correspond to a same subcarrier set (for example, three same subcarriers), the terminal device accessing the local cell and the terminal device accessing the neighboring cell may correspond to different subcarrier groups in the subcarrier set. Assuming that N=2, when M is an odd number, the first terminal device corresponds to the first candidate subcarrier group in the initial time interval in the at least one consecutive time interval corresponding to the first cell, and when M is an even number the first terminal device corresponds to the second candidate subcarrier group in the initial time interval. In this case, M=PCID mod N=0 mod 2=0 is obtained by the terminal device accessing the local cell, in other words, M is an even number. M=1 is obtained by the terminal device accessing the neighboring cell, in other words, M is an odd number. Therefore, the terminal device accessing the local cell corresponds to the second subcarrier and the third subcarrier in the subcarrier set, and the subcarrier group corresponding to the terminal device accessing the neighboring cell includes the first subcarrier and the second subcarrier in the subcarrier set. This can reduce interference between neighboring cells.

In a possible implementation, when the subcarrier set corresponding to the first terminal device includes three consecutive subcarriers of one resource block, and the subcarrier group corresponding to the first terminal device includes two consecutive subcarriers in the subcarrier set, each time interval T corresponding to the first cell=$(2^L)$ Tmin, where L=floor {(PCID mod N)/2}, floor is a round-down function, N is a positive integer, mod is a modulo operation, and Tmin is a time unit.

In a possible implementation, a value of Tmin may be a preset value, or a value of Tmin belongs to a preset Tmin value set. For example, the Tmin value set may be {Tmin 0, Tmin 1, Tmin 2, ..., Tmin K}, where K is a positive integer. Tmin may be represented by a "subframe (subframe)" or a "system frame (System frame)". For example, Tmin=64*Tsubframe or Tmin=64*Tframe, where Tsubframe is duration of one subframe, and Tframe is duration of one system frame.

In a possible implementation, the first terminal device may obtain Tmin by using downlink control information, higher layer signaling, radio resource control signaling, or broadcast signaling.

Lengths of all the at least one time interval corresponding to the first cell are the same or different. For example, when the value of Tmin is the preset value, the lengths of all the at least one time interval corresponding to the first cell are the same. When the value of Tmin is a value notified by the base station by using the downlink control information, the higher layer signaling, the radio resource control signaling, or the broadcast signaling, the lengths of all the at least one time interval corresponding to the first cell are the same or different.

In a possible implementation, there is an offset of R subcarrier groups between subcarrier groups corresponding to the first terminal device in adjacent time intervals in the at least one time interval, in other words, the offset is measured in one subcarrier group, where R is an integer.

For example, assuming that a first time interval and a second time interval in the at least one time interval are adjacent time intervals, a subcarrier group corresponding to the first terminal device in the first time interval includes a first subcarrier and a second subcarrier in a subcarrier set, and a subcarrier group corresponding to the first terminal device in the second time interval includes the second subcarrier and a third subcarrier in the subcarrier set, there is an offset of one subcarrier group between the subcarrier groups corresponding to the first terminal device at the adjacent time intervals.

In a possible implementation, in each of the at least one time interval, a subcarrier group corresponding to the first terminal device is the same as that corresponding to the first terminal device in the initial time interval, namely, the subcarrier groups corresponding to the first terminal device are not offset.

In a possible implementation, for the first cell and a second cell in at least one cell, each of the at least one time interval corresponding to the first cell may be different from each of at least one time interval corresponding to the second cell.

In this case, when a subcarrier group corresponding to a terminal device in the first cell and a subcarrier group corresponding to a terminal device in the second cell are in a same subcarrier set, the terminal device in the first cell and the terminal device in the second cell may correspond to different subcarrier groups in the same subcarrier set in different time intervals. This reduces interference between neighboring cells. For example, assuming that the first cell is a local cell, the second cell is a neighboring cell of the local cell, and a terminal device accessing the local cell and a terminal device accessing the neighboring cell correspond to a same subcarrier set and a same subcarrier group in an initial time interval, a subcarrier group that is in the subcarrier set and that corresponds to the terminal device accessing the local cell may change based on T1, and a subcarrier group that is in the subcarrier set and that corresponds to the terminal device accessing the neighboring cell may change based on T2, where T1 and T2 are different time intervals. Therefore, the terminal device accessing the local cell and the terminal device accessing the neighboring cell may correspond to different subcarrier groups in the subcarrier set in different time intervals. This reduces interference between neighboring cells.

Figure 6:
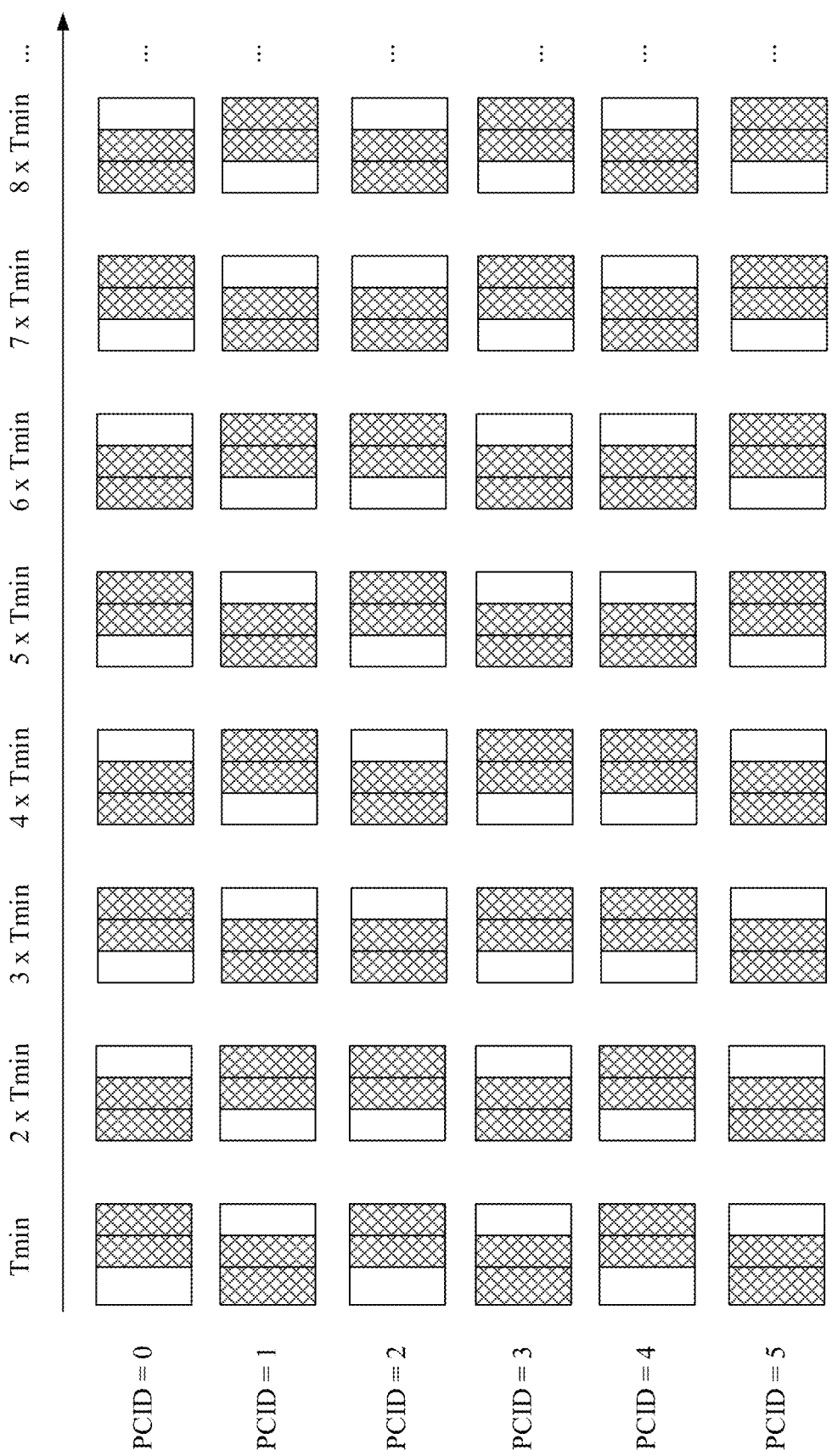
FIG. 6 is a schematic diagram of a subcarrier group that is in a subcarrier set and that corresponds to a terminal device in at least one cell according to an embodiment of this application.

For example, as shown in FIG. 6, it is assumed that the local cell is a cell whose PCID is 0, the neighboring cell is any one of cells whose PCIDs are 1 to 5, and the subcarrier set corresponding to the terminal device in the local cell and a subcarrier set corresponding to the terminal device in the neighboring cell are the same and are three consecutive subcarriers. It is assumed that N=6. It can be learned according to the foregoing method that, change periods of cells whose PCID=0 and PCID=1 are Tmin, change periods of cells whose PCID=2 and PCID=3 are 2×Tmin, and change periods of cells whose PCID=4 and PCID=5 are 4×Tmin. It can be learned that in the initial time interval (that is, Tmin), the subcarrier group that is in the subcarrier set and that corresponds to the terminal device accessing the local cell includes the second subcarrier and the third subcarrier, and subcarrier groups that are in the subcarrier set and that correspond to terminal devices in cells whose PCID=2 and PCID=4 also include the second subcarrier and the third subcarrier. Consequently, interference may be caused between the local cell and the foregoing two cells. If the interference always exists (that is, fixed interference), a communication status of the terminal device may be relatively seriously affected. According to the method provided in this application, a subcarrier group corresponding to each terminal device accessing each cell may periodically change in a subcarrier set corresponding to the terminal device. For example, at a $(2 \times Tmin)^{th}$ time interval, a subcarrier group that is in the subcarrier set and that corresponds to the terminal device accessing the local cell includes a first subcarrier and a second subcarrier, and a subcarrier group that is in the subcarrier set and that corresponds to a terminal device accessing a cell whose PCID=2 still includes the second subcarrier and a third subcarrier. Therefore, interference between the local cell and the cell whose PCID=2 is randomized, and this can reduce inter-cell interference. Similarly, at a $(5*Tmin)^{th}$ time interval, a subcarrier group that is in the subcarrier set and that corresponds to the terminal device accessing the local cell includes the second subcarrier and the third subcarrier, and a subcarrier group that is in the subcarrier set and that corresponds to a terminal device accessing a cell whose PCID=4 includes the first subcarrier and the second subcarrier. Therefore, interference between the local cell and the cell whose PCID=4 is randomized, and this can reduce interference between neighboring cells.

In a possible implementation, for the first cell and a second cell in at least one cell corresponding to the base station, each of the at least one time interval corresponding to the first cell may be the same as each of at least one time interval corresponding to the second cell.

According to the foregoing example, at $(Tmin)^{th}$ time interval, a subcarrier group that is in the subcarrier set and that corresponds to the terminal device accessing the local cell includes a first subcarrier and a second subcarrier, and a subcarrier group that is in the subcarrier set and that corresponds to a terminal device accessing a cell whose PCID=1 includes the second subcarrier and a third subcarrier. There is a same time interval between the subcarrier group that is in the subcarrier set and that corresponds to the terminal device accessing the local cell and the subcarrier group that is in the subcarrier set and that corresponds to a terminal device accessing a cell whose PCID=1. Therefore, it is ensured that the subcarrier group that is in the subcarrier set and that corresponds to the terminal device accessing the local cell and the subcarrier group that is in the subcarrier set and that corresponds to a terminal device accessing a cell whose PCID=1 are not always completely the same in each time interval. This can reduce interference between neighboring cells. Similarly, a subcarrier group that is in the subcarrier set and that corresponds to a terminal device accessing a cell whose PCID=2 and a subcarrier group that is in the subcarrier set and that corresponds to a terminal device accessing a cell whose PCID=3 are not always completely the same at each time interval. A subcarrier group that is in the subcarrier set and that corresponds to a terminal device accessing a cell whose PCID=4 and a subcarrier group that is in the subcarrier set and that corresponds to a terminal device accessing a cell whose PCID=5 are not always completely the same in each time interval. This can reduce interference between neighboring cells.

304: The first terminal device sends uplink data on the subcarrier group corresponding to the first terminal device.

The first terminal device may send the uplink data on the subcarrier group corresponding to the first terminal device, in a part of the at least one time interval, all time intervals, or a part of a subframe of one interval.

305: The base station determines, based on the physical cell identity PCID of the first cell and the preset rule, the subcarrier group corresponding to the first terminal device in the first cell, where the subcarrier group corresponding to the first terminal device includes some subcarriers in the subcarrier set corresponding to the first terminal device.

For a method for determining the subcarrier group corresponding to the first terminal device by the base station, refer to the method for determining the subcarrier group corresponding to the first terminal device by the first terminal device in step 303. Details are not described herein.

306: The base station receives, on the subcarrier group corresponding to the first terminal device, the uplink data sent by the first terminal device.

It may be understood that, the base station receives the uplink data sent by the first terminal device, on the subcarrier group corresponding to the first terminal device in a part of the at least one time interval, all time intervals, or a part of a subframe of one interval.

Figure 7:
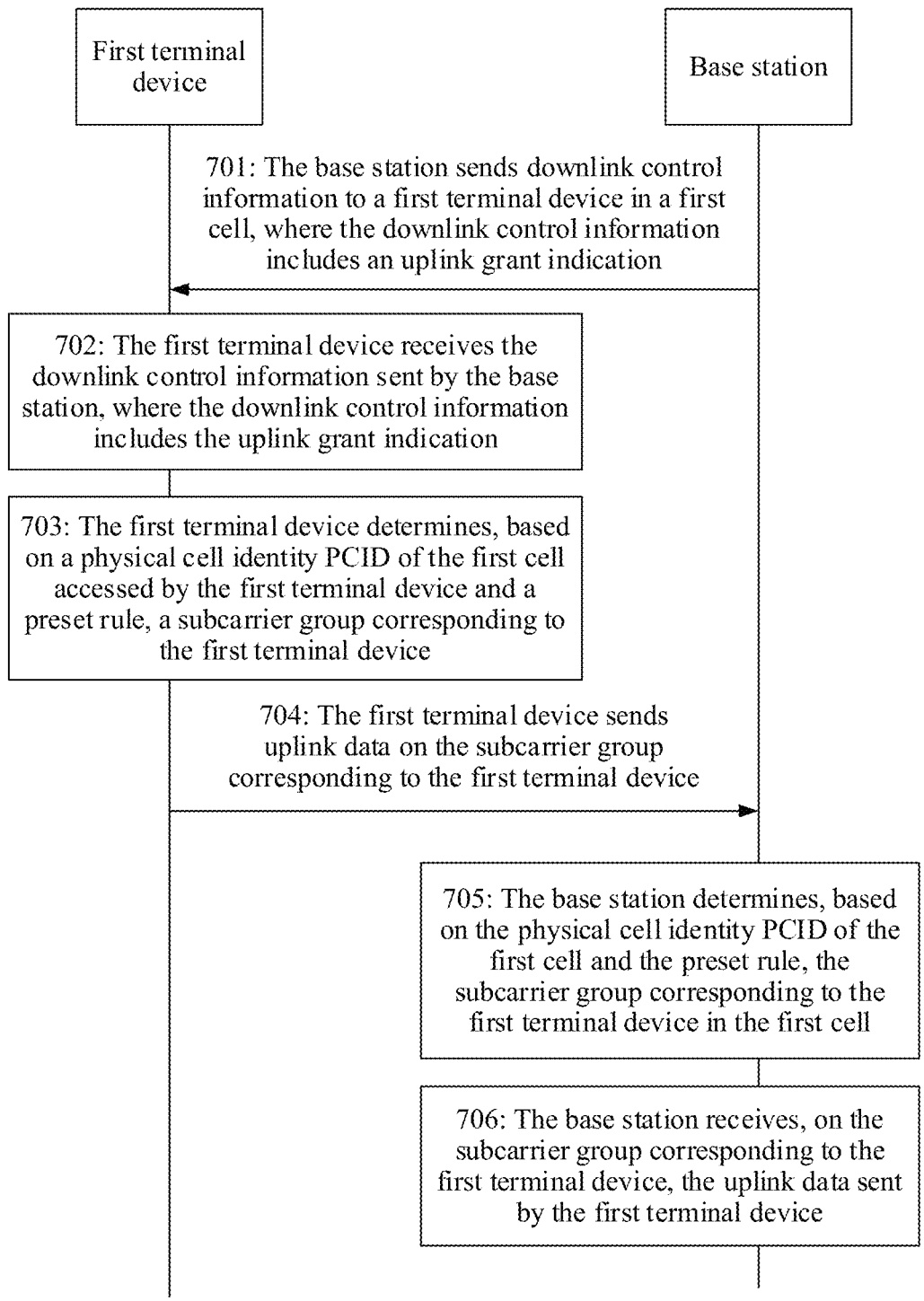
FIG. 7 is a schematic diagram of signal interaction in a resource allocation method according to an embodiment of this application.

Another embodiment of this application provides a resource allocation method. An example in which a subcarrier set corresponding to a first terminal device includes all subcarriers of one resource block, and a subcarrier group corresponding to the first terminal device includes three or six consecutive subcarriers in the subcarrier set is used for description. As shown in FIG. 7, the method includes the following steps.

701: A base station sends downlink control information to a first terminal device in a first cell, where the downlink control information includes an uplink grant indication.

The uplink grant indication may be used to indicate a subcarrier set corresponding to the first terminal device in the first cell and a subcarrier group corresponding to the first terminal device in the first cell.

The first terminal device may correspond to at least two candidate subcarrier groups, and each candidate subcarrier group includes a plurality of consecutive subcarriers.

In a possible implementation, the first terminal device corresponds to four candidate subcarrier groups when the subcarrier set corresponding to the first terminal device includes 12 consecutive subcarriers of one resource block, and the subcarrier group corresponding to the first terminal device includes three consecutive subcarriers in the subcarrier set, where a first candidate subcarrier group includes a first subcarrier to a third subcarrier in the subcarrier set, a second candidate subcarrier group includes a fourth subcarrier to a sixth subcarrier in the subcarrier set, a third candidate subcarrier group includes a seventh subcarrier to a ninth subcarrier in the subcarrier set, and a fourth candidate subcarrier group includes a tenth subcarrier to a twelfth subcarrier in the subcarrier set.

It should be noted that the subcarrier group corresponding to the first terminal device may be offset between the four candidate subcarrier groups corresponding to the first terminal device, and may be offset by three, six, or nine subcarriers each time. Optionally, an offset parameter may be used to indicate a quantity of offset subcarriers or a quantity of offset subcarrier groups of the subcarrier group corresponding to the first terminal device. For example, when offset=1 or 0 unit, the subcarrier group corresponding to the first terminal device may be offset by three subcarriers in the subcarrier set each time. For example, the subcarrier group corresponding to the first terminal device may be offset from the first candidate subcarrier group to the second candidate subcarrier group, to be specific, the subcarrier group corresponding to the first terminal device may be offset from the first subcarrier to the third subcarrier in the subcarrier set to the fourth subcarrier to the sixth subcarrier in the subcarrier set. When offset=1 or 2 units, the subcarrier group corresponding to the first terminal device may be offset by six subcarriers in the subcarrier set each time. For example, the subcarrier group corresponding to the first terminal device may be offset from the first candidate subcarrier group to the third candidate subcarrier group, to be specific, the subcarrier group corresponding to the first terminal device may be offset from the first subcarrier to the third subcarrier in the subcarrier set to the seventh subcarrier to the ninth subcarrier in the subcarrier set. When offset=2 or 3 units, the subcarrier group corresponding to the first terminal device may be offset by nine subcarriers in the subcarrier set each time. For example, the subcarrier group corresponding to the first terminal device may be offset from the first candidate subcarrier group to the fourth candidate subcarrier group, to be specific, the subcarrier group corresponding to the first terminal device may be offset from the first subcarrier to the third subcarrier in the subcarrier set to the tenth subcarrier to the twelfth subcarrier in the subcarrier set.

In a possible implementation, optionally, the subcarrier group corresponding to the first terminal device may alternatively indicate an offset value in a unit of a subcarrier group, in other words, an offset of one, two, or three carrier groups. For example, when offset=1 or 0 unit, the subcarrier group corresponding to the first terminal device may be offset by one subcarrier group in the subcarrier set each time. For example, the subcarrier group corresponding to the first terminal device may be offset from the first candidate subcarrier group to the second candidate subcarrier group. When offset=1 or 2 units, the subcarrier group corresponding to the first terminal device may be offset by two subcarrier groups in the subcarrier set each time. For example, the subcarrier group corresponding to the first terminal device may be offset from the first candidate subcarrier group to the third candidate subcarrier group. When offset=2 or 3 units, the subcarrier group corresponding to the first terminal device may be offset by three subcarrier groups in the subcarrier set each time. For example, the subcarrier group corresponding to the first terminal device may be offset from the first candidate subcarrier group to the fourth candidate subcarrier group.

In a possible implementation, the first terminal device corresponds to two candidate subcarrier groups when the subcarrier set corresponding to the first terminal device includes 12 consecutive subcarriers of one resource block, and the subcarrier group corresponding to the first terminal device includes six consecutive subcarriers in the subcarrier set, where a first candidate subcarrier group includes a first subcarrier to a sixth subcarrier in the subcarrier set, and a second candidate subcarrier group includes a seventh subcarrier to a twelfth subcarrier in the subcarrier set.

It should be noted that the subcarrier group corresponding to the first terminal device may be offset between the two candidate subcarrier groups corresponding to the first terminal device. For example, the subcarrier group corresponding to the first terminal device may be offset by six subcarriers in the subcarrier set each time. Specifically, the subcarrier group corresponding to the first terminal device may be offset from the first subcarrier to the sixth subcarrier to the seventh subcarrier to the twelfth subcarrier, or may be offset from the seventh subcarrier to the twelfth subcarrier of the resource block to the first subcarrier to the sixth subcarrier.

Figure 8A:
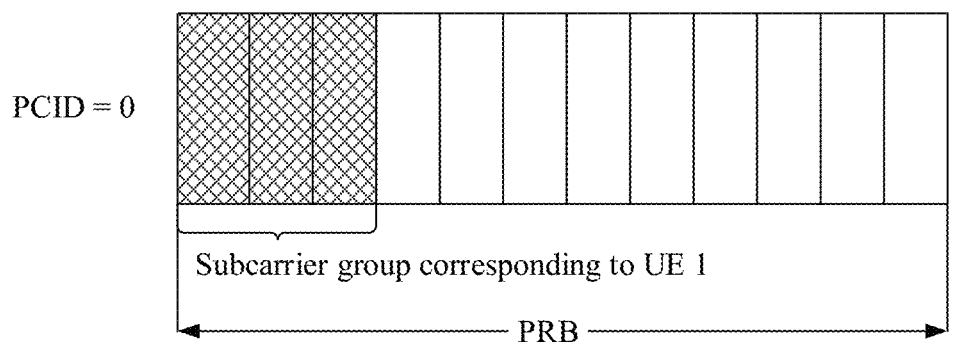
FIG. 8(*a*) and FIG. 8(*b*) are schematic diagrams of a subcarrier group that is in a subcarrier set and that corresponds to a terminal device according to an embodiment of this application.
Figure 8B:
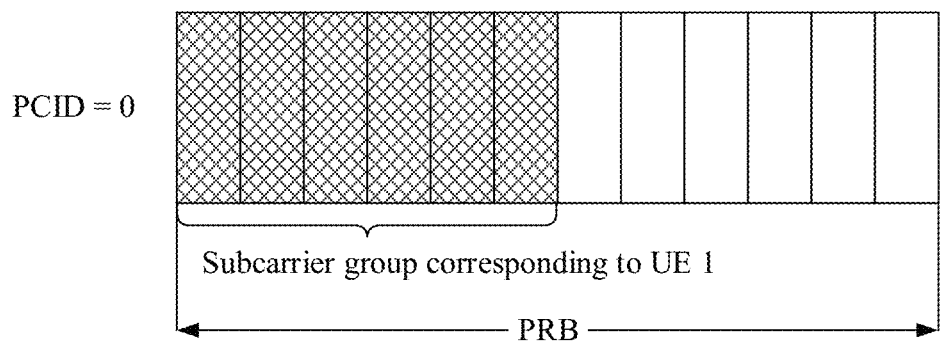

For example, it is assumed that a PCID of the first cell is 0, the first terminal device is UE 1, and the subcarrier set corresponding to the first terminal device includes all subcarriers of one resource block. As shown in FIG. 8(*a*), when the subcarrier group corresponding to the first terminal device includes three consecutive subcarriers in the subcarrier set, the subcarrier group corresponding to the UE 1 may include the first subcarrier to the third subcarrier of the resource block. As shown in FIG. 8(*b*), when the subcarrier group corresponding to the first terminal device includes six consecutive subcarriers in the subcarrier set, the subcarrier group corresponding to the UE 1 may include the first subcarrier to the sixth subcarrier of the resource block. It should be noted that a same subcarrier of a same cell may be not allocated to two terminal devices.

In a possible implementation, the uplink grant indication may further include a modulation and coding scheme and the like used by the first terminal device to transmit data. The uplink grant indication may be configured in a random access response or higher layer signaling. This is not limited in this application.

702: The first terminal device receives the downlink control information sent by the base station, where the downlink control information includes the uplink grant indication.

For related description of the uplink grant indication, refer to step 701. Details are not described herein.

703: The first terminal device determines, based on the physical cell identity PCID of the first cell accessed by the first terminal device and a preset rule, the subcarrier group corresponding to the first terminal device, where the subcarrier group corresponding to the first terminal device includes some subcarriers in the subcarrier set corresponding to the first terminal device.

In a possible implementation, the first terminal device determines, based on the PCID of the first cell, a subcarrier group corresponding to the first terminal device in each of at least one consecutive time interval corresponding to the first cell.

For example, when the subcarrier set includes 12 consecutive subcarriers of one resource block, and the subcarrier group corresponding to the first terminal device includes three consecutive subcarriers or six consecutive subcarriers in the subcarrier set, each time interval T corresponding to the first cell=($2^L$) Tmin, where L=(PCID mod N), PCID is the PCID of the first cell, mod is a modulo operation, Tmin is a time unit, N is a positive integer, and a value of N may be a fixed value, for example, 3, 6, 7, or 18.

In a possible implementation, a value of Tmin may be a preset value, or a value of Tmin belongs to a preset Tmin value set. For example, the Tmin value set may be {Tmin 0. Tmin 1, Tmin 2, . . . , Tmin K}, where K is a positive integer. Tmin may be represented by "subframe" or "system frame". For example, Tmin=64*Tsubframe or Tmin=64*Tframe, where Tsubframe is duration of one subframe, and Tframe is duration of one system frame.

In a possible implementation, the first terminal device may obtain Tmin by using downlink control information, higher layer signaling, radio resource control signaling, or broadcast signaling.

Lengths of all the at least one time interval corresponding to the first cell are the same or different. For example, when the value of Tmin is the preset value, the lengths of all the at least one time interval corresponding to the first cell are the same. When the value of Tmin is a value notified by the base station by using the downlink control information, the higher layer signaling, the radio resource control signaling, or the broadcast signaling, the lengths of all the at least one time interval corresponding to the first cell are the same or different.

In a possible implementation, there is an offset of R subcarriers or R subcarrier groups between subcarrier groups corresponding to the first terminal device in adjacent time intervals in the at least one time interval, where R is an integer. It can be learned from the related description in step 701 that when the subcarrier set corresponding to the first terminal device includes 12 consecutive subcarriers of one resource block, and the subcarrier group corresponding to the first terminal device includes three consecutive subcarriers in the subcarrier set, the subcarrier group corresponding to the first terminal device may be offset by three, six, or nine subcarriers. When the subcarrier set corresponding to the first terminal device includes 12 consecutive subcarriers of one resource block, and the subcarrier group corresponding to the first terminal device includes six consecutive subcarriers in the subcarrier set, subcarrier groups corresponding to the first terminal device may be offset by six subcarriers.

In a possible implementation, at each of the at least one time interval, a subcarrier group corresponding to the first terminal device is the same as a subcarrier group that corresponds to the first terminal device and that is specified on a downlink control channel, in other words, the subcarrier group corresponding to the first terminal device is not offset.

In a possible implementation, for the first cell and a second cell in at least one cell, each of the at least one time interval corresponding to the first cell may be different from each of at least one time interval corresponding to the second cell.

In this case, when a subcarrier group corresponding to a terminal device in the first cell and a subcarrier group corresponding to a terminal device in the second cell are in a same subcarrier set, the terminal device in the first cell and the terminal device in the second cell may correspond to different subcarrier groups in the same subcarrier set in different time intervals. This reduces interference between neighboring cells. For example, assuming that the first cell is a local cell, the second cell is a neighboring cell of the local cell, and a terminal device accessing the local cell and a terminal device accessing the neighboring cell correspond to a same subcarrier set and a same subcarrier group in an initial time interval, a subcarrier group that is in the subcarrier set and that corresponds to the terminal device accessing the local cell may change based on T1, and a subcarrier group that is in the subcarrier set and that corresponds to the terminal device accessing the neighboring cell may change based on T2, where T1 and T2 are different time intervals. Therefore, the terminal device accessing the local cell and the terminal device accessing the neighboring cell may correspond to different subcarrier groups in the subcarrier set in different time intervals. This reduces interference between neighboring cells.

Figure 9:
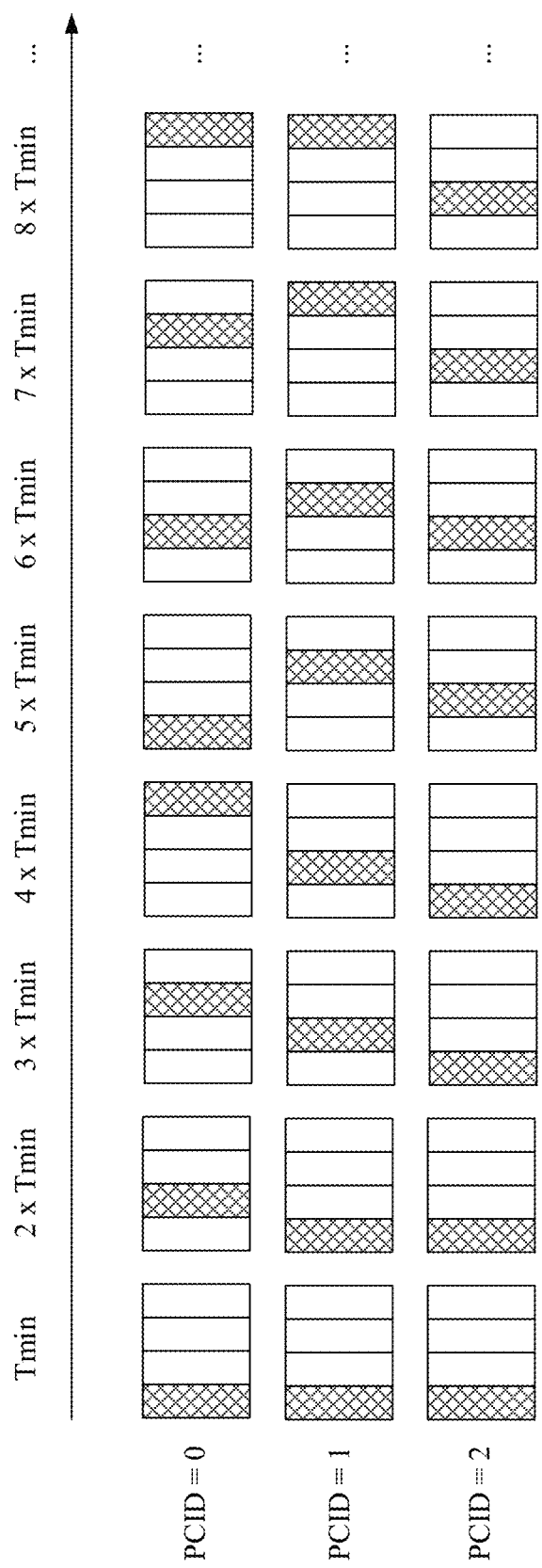
FIG. 9 is a schematic diagram of a subcarrier group that is in a subcarrier set and that corresponds to a terminal device in at least one cell according to an embodiment of this application.

For example, as shown in FIG. 9, an example in which each grid represents three subcarriers is used for illustration. It is assumed that the local cell is a cell whose PCID=0, the neighboring cell is a cell whose PCID=1 or PCID=2, and the subcarrier set corresponding to the terminal device in the local cell and a subcarrier set corresponding to the terminal device in the neighboring cell are the same and are 12 consecutive subcarriers (which is illustrated by four consecutive grids in FIG. 9). When the subcarrier group corresponding to the first terminal device includes three consecutive subcarriers in the subcarrier set, assuming that N=3, it can be learned from the foregoing method that each time interval of the cell whose PCID=0 is Tmin, each time interval of the cell whose PCID=2 is 2*×Tmin, and each time interval of a cell whose PCID=3 is 4*×Tmin. It can be learned that at an initial moment (that is, Tmin), a subcarrier group that is in the subcarrier set and that corresponds to the terminal device accessing the local cell includes a first subcarrier to a third subcarrier (that is, a first grid), and subcarrier groups that are in the subcarrier set and that correspond to terminal devices in the cells whose PCID=1 and PCID=2 also include the first subcarrier to the third subcarrier. Consequently, interference may be caused between the local cell and the foregoing two cells. If the interference always exists (that is, fixed interference), communication efficiency of the terminal device may be relatively seriously affected. According to the method provided in this application, a subcarrier group corresponding to each terminal device accessing each cell may periodically change in a subcarrier set corresponding to the terminal device. For example, at a $(2*Tmin)^{th}$ time interval, a subcarrier group that is in the subcarrier set and that corresponds to the terminal device accessing the local cell includes a fourth subcarrier to a sixth subcarrier (that is, a second grid), and a subcarrier group that is in the subcarrier set and that corresponds to a terminal device accessing the cell whose PCID=1 still includes a first subcarrier and a third subcarrier Therefore, interference between the local cell and the cell whose PCID=1 is randomized, and this can reduce interference between cells. Similarly, at a $(5*Tmin)^{th}$ time interval, a subcarrier group that is in the subcarrier set and that corresponds to the terminal device accessing the local cell includes a first subcarrier to a third subcarrier, and a subcarrier group that is in the subcarrier set and that corresponds to a terminal device accessing the cell whose PCID=2 includes a fourth subcarrier to a sixth subcarrier. Therefore, interference between the local cell and the cell whose PCID=2 is randomized, and this can reduce interference between neighboring cells.

Figure 10:
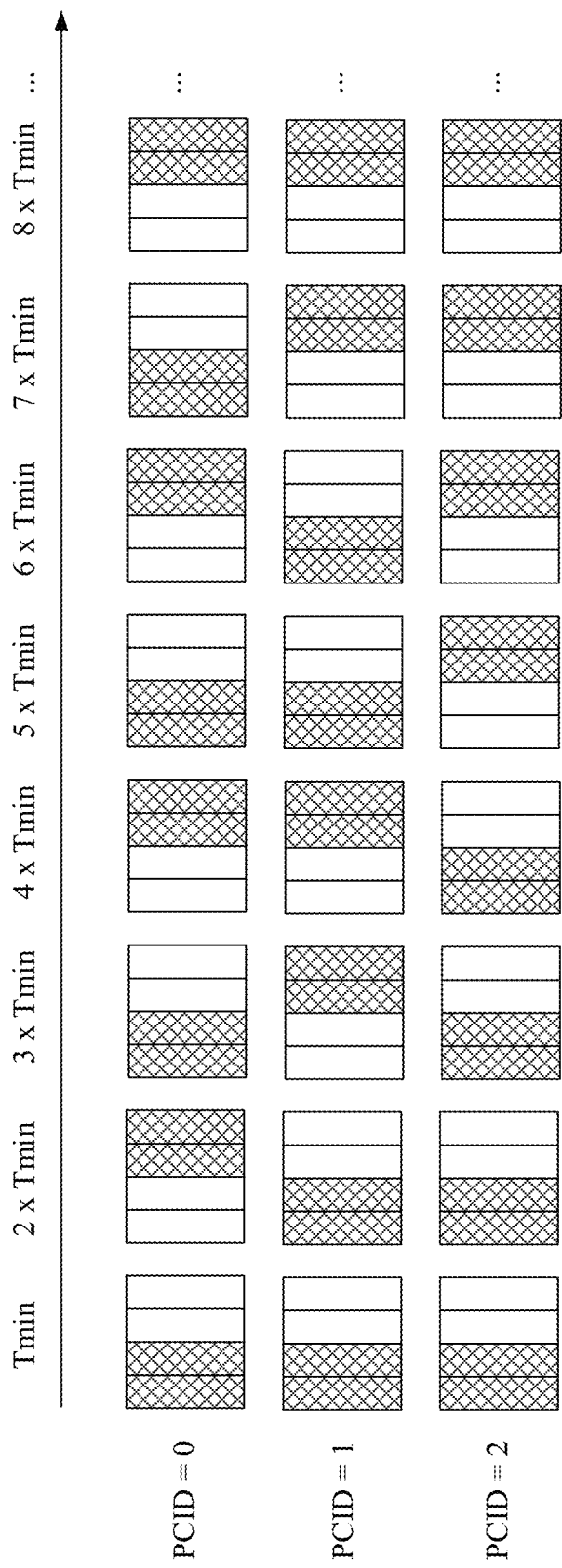
FIG. 10 is a schematic diagram of a subcarrier group that is in a subcarrier set and that corresponds to a terminal device in at least one cell according to an embodiment of this application.

As shown in FIG. 10, an example in which each grid represents three subcarriers is used for illustration. If the local cell is a cell whose PCID=0, the neighboring cell is a cell whose PCID is 1 or 2, and the subcarrier set corresponding to the terminal device in the local cell and the subcarrier set corresponding to the terminal device in the neighboring cell are the same and are 12 consecutive subcarriers (that is, four consecutive grids in FIG. 10). When the subcarrier group corresponding to the first terminal device includes six consecutive subcarriers in the subcarrier set, assuming that N=3, it can be learned from the foregoing method that each time interval of the cell whose PCID=0 is Tmin, each time interval of the cell whose PCID=2 is 2*Tmin, and each time interval of a cell whose PCID=3 is 4*Tmin. It can be learned that at an initial moment (that is. Tmin), a subcarrier group that is in the subcarrier set and that corresponds to the terminal device accessing the local cell includes a first subcarrier to a sixth subcarrier (that is, a first grid and a second grid), and subcarrier groups that are in the subcarrier set and that correspond to terminal devices in the cells whose PCID=1 and PCID=2 also include the first subcarrier to the sixth subcarrier. Consequently, interference may be caused between the local cell and the foregoing two cells. If the interference always exists (that is, fixed interference), communication efficiency of the terminal device may be relatively seriously affected. According to the method provided in this application, a subcarrier group corresponding to each terminal device accessing each cell may periodically change in a subcarrier set corresponding to the terminal device. For example, at a $(2*Tmin)^{h}$ time interval, a subcarrier group that is in the subcarrier set and that corresponds to the terminal device accessing the local cell includes a seventh subcarrier to a twelfth subcarrier (that is, a third grid and a fourth grid), and a subcarrier group that is in the subcarrier set and that corresponds to a terminal device accessing the cell whose PCID=1 still includes a first subcarrier to a sixth subcarrier. Therefore, interference between the local cell and the cell whose PCID=1 is randomized, and this can reduce interference between cells. Similarly, at a $(5*Tmin)^{th}$ time interval, a subcarrier group that is in the subcarrier set and that corresponds to the terminal device accessing the local cell includes a first subcarrier to a sixth subcarrier, and a subcarrier group that is in the subcarrier set and that corresponds to a terminal device accessing the cell whose PCID=2 includes a seventh subcarrier to a twelfth subcarrier. Therefore, interference between the local cell and the cell whose PCID=2 is randomized, and this can reduce interference between neighboring cells.

In a possible implementation, for the first cell and a second cell in at least one cell corresponding to the base station, each of the at least one time interval corresponding to the first cell may be the same as each of at least one time interval corresponding to the second cell.

For example, it is assumed that the subcarrier set corresponding to terminal device accessing the local cell and a subcarrier set corresponding to terminal device accessing the neighboring cell are the same and are 12 consecutive subcarriers, and corresponding subcarrier groups are different and are three consecutive subcarriers. There is a same time interval between the subcarrier group that is in the subcarrier set and that corresponds to the terminal device accessing the local cell and the subcarrier group that is in the subcarrier set and that corresponds to the terminal device accessing the neighboring cell. Therefore, it is ensured that the subcarrier group that is in the subcarrier set and that corresponds to the terminal device accessing the local cell and the subcarrier group that is in the subcarrier set and that corresponds to the terminal device accessing the neighboring cell are not always completely the same at each time interval. This can reduce interference between neighboring cells. Similarly, it is assumed that the subcarrier set corresponding to terminal device accessing the local cell and a subcarrier set corresponding to terminal device accessing the neighboring cell are the same and are 12 consecutive subcarriers, and corresponding subcarrier groups are different and are six consecutive subcarriers. There is a same time interval between the subcarrier group that is in the subcarrier set and that corresponds to the terminal device accessing the local cell and the subcarrier group that is in the subcarrier set and that corresponds to the terminal device accessing the neighboring cell. Therefore, it is ensured that the subcarrier group that is in the subcarrier set and that corresponds to the terminal device accessing the local cell and the subcarrier group that is in the subcarrier set and that corresponds to the terminal device accessing the neighboring cell are not always completely the same at each time interval. This can reduce interference between neighboring cells.

Figure 11:
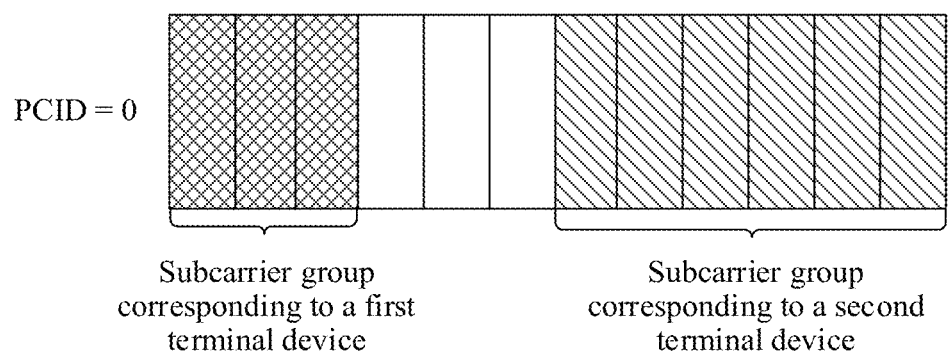
FIG. 11 is a schematic diagram of a subcarrier group that is in a subcarrier set and that corresponds to a terminal device according to an embodiment of this application.

In a possible implementation, the first terminal device and a second terminal device in the first cell may correspond to different quantities of subcarrier groups in a same subcarrier set. For related actions of the second terminal device, refer to related descriptions of the first terminal device. Details are not described herein. For example, as shown in FIG. 11, assuming that a PCID of the first cell is 0, the base station may determine that the first terminal device corresponds to a first subcarrier to a third subcarrier in a subcarrier set, and the second terminal device corresponds to a seventh subcarrier to a twelfth subcarrier in the subcarrier set.

It should be noted that, to avoid a conflict between subcarrier groups corresponding to different terminal devices in the first cell in each change period, both the first subcarrier group and the second subcarrier group need to be offset by M subcarriers in each change period, where M is a preset value. For example, M may be 6.

Figure 12:
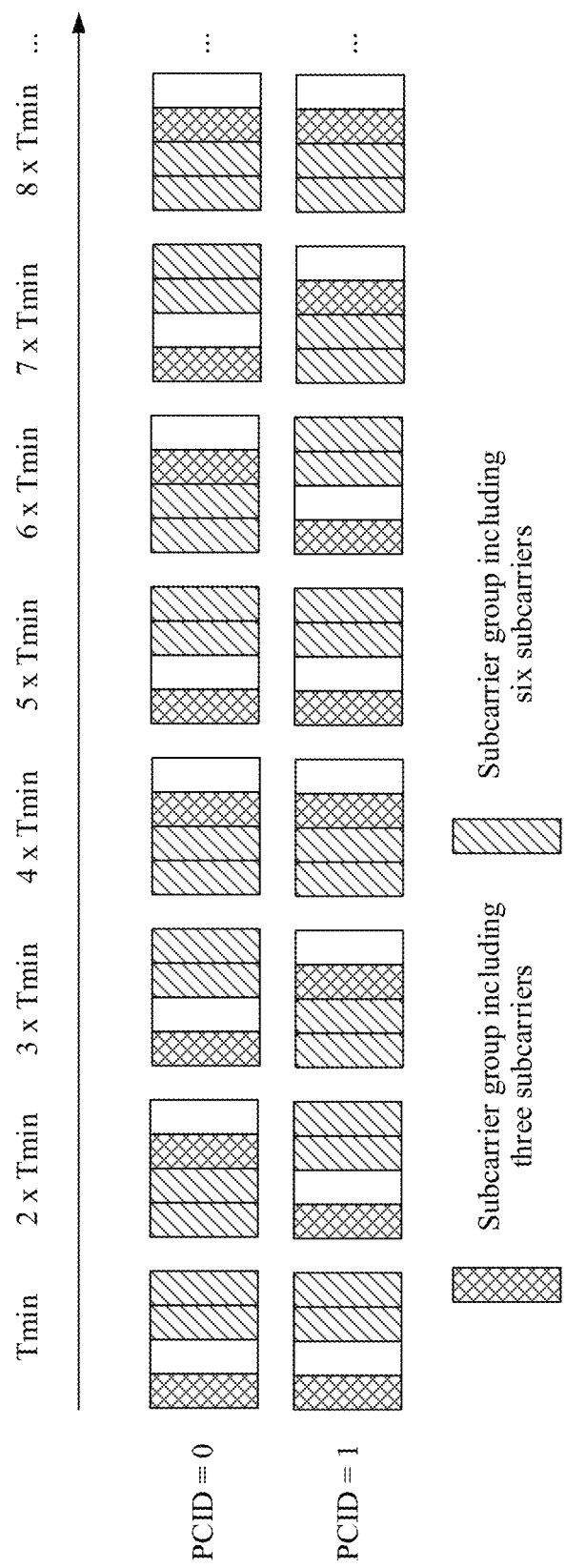
FIG. 12 is a schematic diagram of subcarrier groups that are in a subcarrier set and that correspond to a first terminal device and a second terminal device in at least one cell according to an embodiment of this application.

For example, as shown in FIG. 12, an example in which each grid represents three subcarriers is used for illustration. It is assumed that the first cell is a local cell whose PCID=0, when M is 6, both a subcarrier group (that is, a subcarrier group including three subcarriers) corresponding to the first terminal device in the local cell and a subcarrier group (that is, a subcarrier group including six subcarriers) corresponding to the second terminal device in the local cell are offset by six subcarriers in each change period. This can avoid a conflict between the subcarrier group corresponding to the first terminal device in the first cell and the subcarrier group corresponding to the second terminal device in each change period. In addition, it is assumed that a PCID of a neighboring cell of the local cell is 1, a subcarrier group (that is, a subcarrier group including three subcarriers) corresponding to a first terminal device in the neighboring cell is the same as a subcarrier group corresponding to a first terminal device in the local cell, and a subcarrier group (that is, a subcarrier group including six subcarriers) corresponding to a second terminal device in the neighboring cell is the same as a subcarrier group corresponding to a second terminal device in the local cell. It can be learned, from related descriptions in step 703, that a change period of the subcarrier group corresponding to the first terminal device in the local cell may be different from a change period of the subcarrier group corresponding to the first terminal device in the neighboring cell. Similarly, a change period of the subcarrier group corresponding to the second terminal device in the local cell may be different from a change period of the subcarrier group corresponding to the second terminal device in the neighboring cell. In this way, continuous interference on subcarrier groups corresponding to terminal devices in different cells can be avoided, in other words, interference can be randomized. This can reduce interference between neighboring cells.

704: The first terminal device sends uplink data on the subcarrier group corresponding to the first terminal device.

The first terminal device may send, at a part of the at least one time interval, all time intervals, or a part of a subframe of one interval, the uplink data on the subcarrier group corresponding to the first terminal device.

In a possible implementation, the second terminal device may send, at a part of the at least one time interval, all time intervals, or a part of a subframe of one interval, the uplink data on the subcarrier group corresponding to the second terminal device.

705: The base station determines, based on the physical cell identity PCID of the first cell and the preset rule, the subcarrier group corresponding to the first terminal device in the first cell, where the subcarrier group corresponding to the first terminal device includes some subcarriers in the subcarrier set corresponding to the first terminal device.

For a method for determining the subcarrier group corresponding to the first terminal device by the base station, refer to the method for determining the subcarrier group corresponding to the first terminal device by the first terminal device in step 703. Details are not described herein.

706: The base station receives, on the subcarrier group corresponding to the first terminal device, the uplink data sent by the first terminal device.

It may be understood that, at the part of the at least one time interval, all the time intervals, or the part of a subframe of one interval, the base station receives, on the subcarrier group corresponding to the first terminal device, the uplink data sent by the first terminal device.

In a possible implementation, at the part of the at least one time interval, all the time intervals, or the part of a subframe of one interval, the base station receives, on the subcarrier group corresponding to the second terminal device, the uplink data sent by the second terminal device.

The foregoing mainly describes the solutions provided in the embodiments of this application from perspectives of the base station and the first terminal device. It may be understood that, to implement the foregoing functions, the base station and the first terminal device include corresponding hardware structures and/or software modules for executing the functions. A person skilled in the art should easily be aware that, in combination with the algorithm steps described in the embodiments disclosed in this specification, this application may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In the embodiments of this application, the base station and the first terminal device may be divided into functional modules based on the foregoing method examples. For example, functional modules corresponding to various functions are obtained through division, or two or more functions may be integrated into one processing module. The integrated module may be implemented in a form of hardware, or may be implemented in a form of a software functional module. It should be noted that, in this embodiment of this application, module division is an example, and is merely a logical function division. In actual implementation, another division manner may be used.

Figure 13:
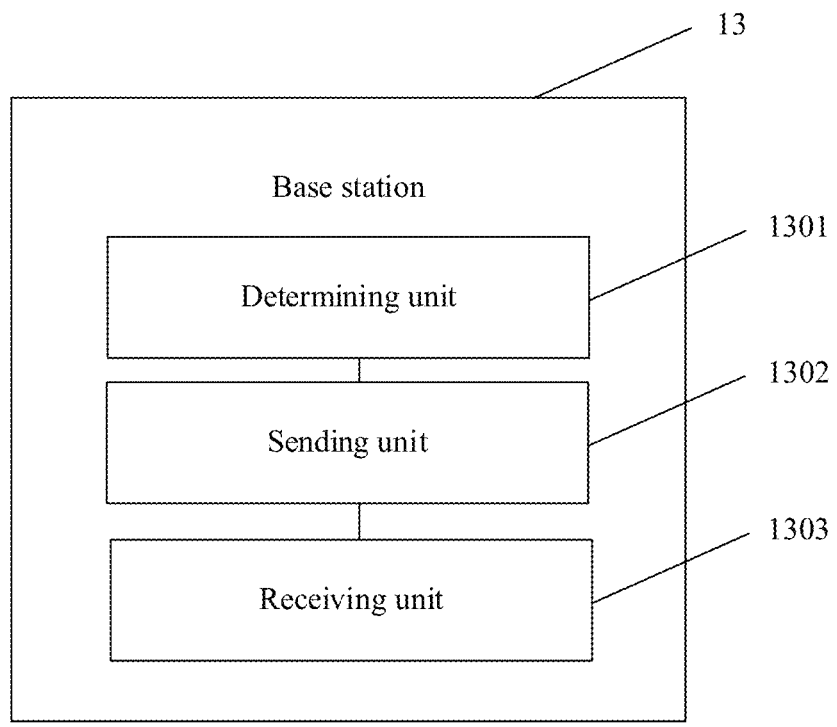
FIG. 13 is a schematic structural diagram of a base station according to an embodiment of this application.

When each functional module is obtained through division based on each corresponding function, FIG. 13 is a possible schematic structural diagram of a base station 13 in the foregoing embodiments. The base station includes a determining unit 1301, a sending unit 1302, and a receiving unit 1303. In this embodiment of this application, the determining unit 1301 may be configured to determine, based on a physical cell identity PCID of a first cell and a preset rule, a subcarrier group corresponding to a first terminal device in the first cell, where the subcarrier group corresponding to the first terminal device includes some subcarriers in a subcarrier set corresponding to the terminal device. In the method embodiment shown in FIG. 3, the determining unit 1301 is configured to support the base station in performing the process 305 in FIG. 3. The sending unit 1302 is configured to support the base station in performing the process 301 in FIG. 3. The receiving unit 1303 is configured to support the base station in performing the process 306 in FIG. 3. In the method embodiment shown in FIG. 7, the determining unit 1301 is configured to support the base station in performing the process 705 in FIG. 7. The sending unit 1302 is configured to support the base station in performing the process 701 in FIG. 7. The receiving unit 1303 is configured to support the base station in performing the process 706 in FIG. 7. All related content of the steps in the foregoing method embodiments may be cited in function descriptions of the corresponding functional modules. Details are not described herein.

Figure 14:
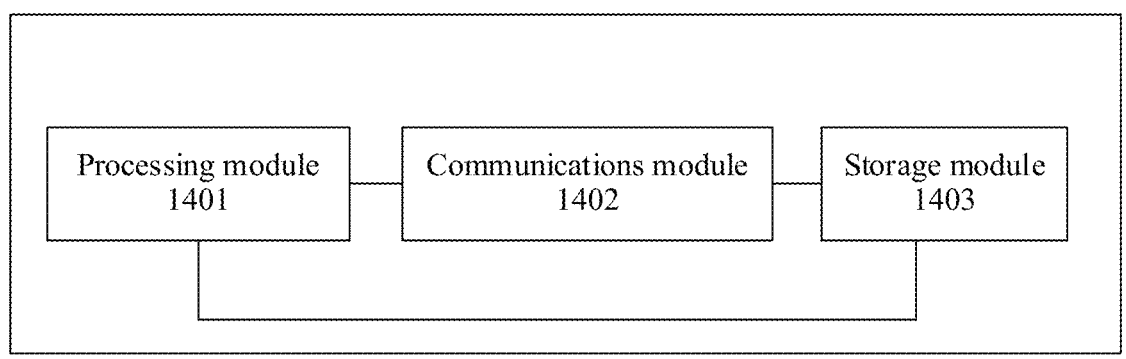
FIG. 14 is a schematic structural diagram of a base station according to an embodiment of this application.

When an integrated unit is used, FIG. 14 is a possible schematic structural diagram of the base station in the foregoing embodiments. In this application, the base station may include a processing module 1401, a communications module 1402, and a storage module 1403. The processing module 1401 is configured to control various hardware apparatuses, application program software, and the like of the base station. The communications module 1402 is configured to receive, in a communication manner such as wireless fidelity (WiFi), an instruction sent by another device, or may send data of the base station to another device. The storage module 1403 is configured to store a software program of the base station, store data, run software, and the like. The processing module 1401 may be a determining unit or a controller, for example, may be a central processing unit (CPU), a general-purpose determining unit, a digital signal processing unit (DSP), an application-specific integrated circuit (ASIC), a field programmable gate array (FPGA), another programmable logic device, a transistor logic device, a hardware component, or any combination thereof. The processor may implement or execute various example logic blocks, modules, and circuits described with reference to content disclosed in this application. Alternatively, the determining unit may be a combination implementing a computing function, for example, a combination including one or more micro determining units, or a combination of a DSP and a micro determining unit. The communications module 1402 may be a transceiver, a transceiver circuit, a communications interface, or the like. The storage module 1403 may be a memory.

Figure 15:
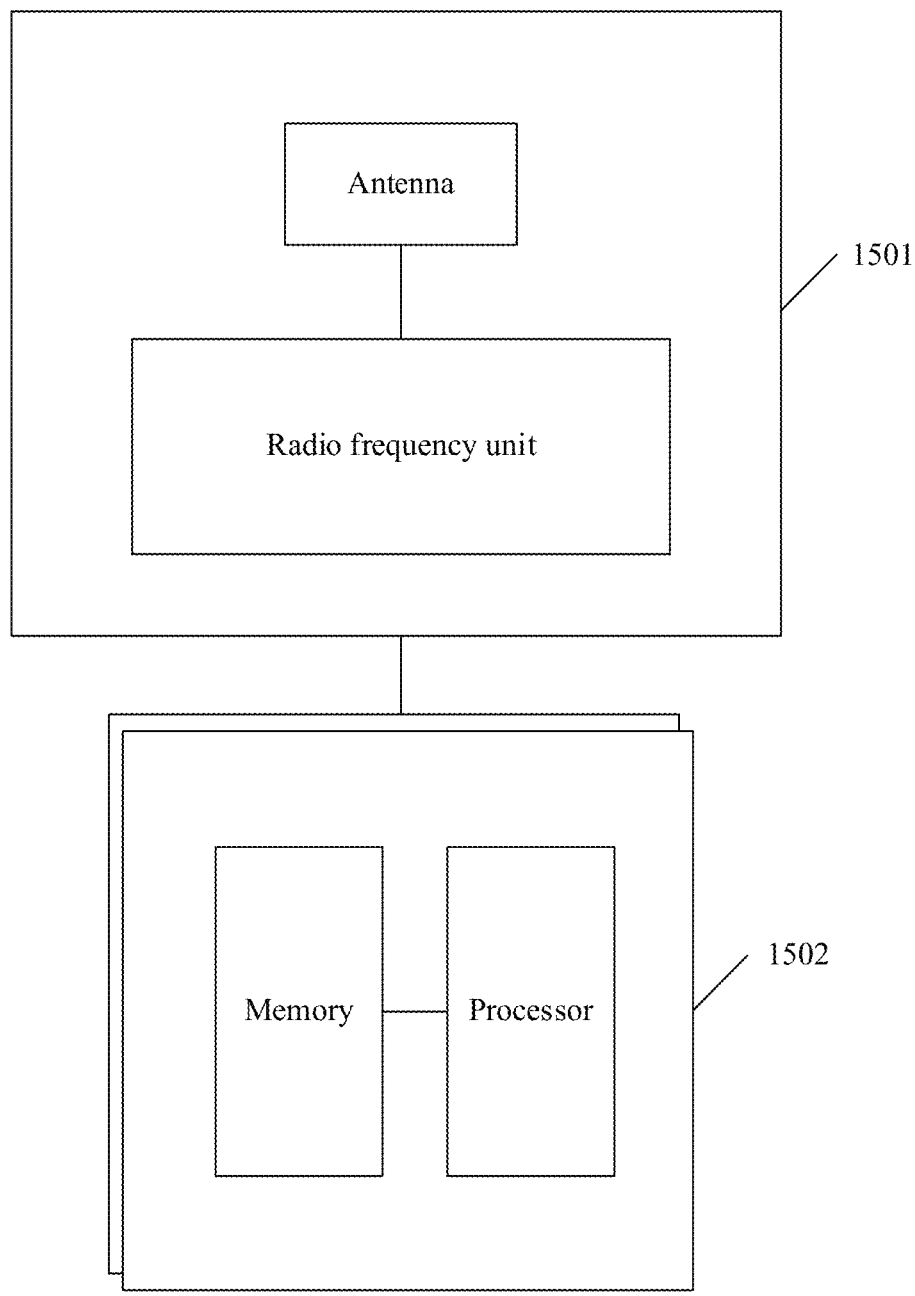
FIG. 15 is a schematic structural diagram of a base station according to an embodiment of this application.

As shown in FIG. 15, an embodiment of this application further provides a base station, including a part 1501 and a part 1502. The part 1501 of the base station is mainly configured to receive and send a radio frequency signal, and perform conversion between the radio frequency signal and a baseband signal. The part 1502 is mainly configured to perform baseband processing, control the base station, and the like. The part 1501 may be usually referred to as a transceiver unit, a transceiver, a transceiver circuit, or the like. The part 1502 is usually a control center of the base station, may be usually referred to as a processing unit, and is configured to control the base station to perform the steps performed by the base station (that is, the serving base station) in FIG. 3. For details, refer to the descriptions of the foregoing related parts.

The transceiver unit of the part 1501 may also be referred to as a transceiver, or the like, and includes an antenna and a radio frequency unit. The radio frequency unit is mainly configured to perform radio frequency processing. Optionally, a component that is of the part 1501 and that is configured to implement a receiving function may be considered as a receiving unit, and a component configured to implement a sending function may be considered as a sending unit. In other words, the part 1501 includes the receiving unit and the sending unit. The receiving unit may also be referred to as a receiver, a receiver circuit, or the like, and the sending unit may be referred to as a transmitter, a transmitter circuit, or the like.

The part 1502 may include one or more boards. Each board may include one or more determining units and one or more memories. The determining unit is configured to read and execute a program in the memory, to implement a baseband processing function and control the base station. If there are a plurality of boards, the boards may be interconnected to enhance a processing capability. In an optional implementation, a plurality of boards may share one or more determining units, or a plurality of boards share one or more memories, or a plurality of boards share one or more determining units at the same time. The memory and the determining unit may be integrated together, or may be independently disposed. In some embodiments, the part 1501 and the part 1502 may be integrated together, or may be independently disposed. In addition, all functions of the part 1502 may be integrated into one chip for implementation, or some functions may be integrated into one chip for implementation and some other functions are integrated into one or more other chips for implementation. This is not limited in this application.

Figure 16:
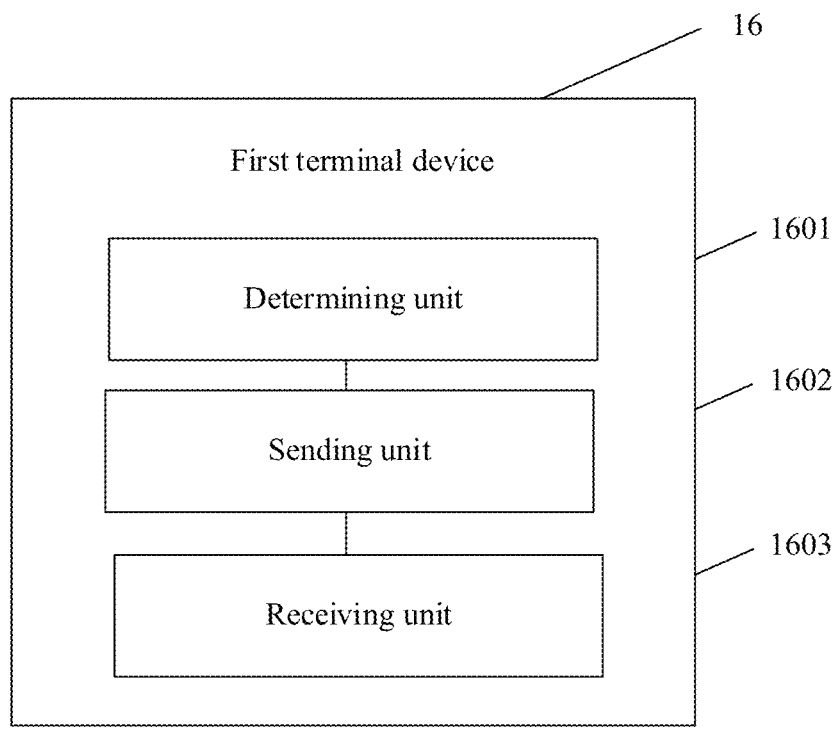
FIG. 16 is a schematic structural diagram of a first terminal device according to an embodiment of this application.

When each functional module is obtained through division based on each corresponding function, FIG. 16 is a possible schematic structural diagram of a first terminal device 16 in the foregoing embodiments. The first terminal device includes a determining unit 1601, a sending unit 1602, and a receiving unit 1603. In this embodiment of this application, the determining unit 1601 may be configured to determine, based on a physical cell identity PCID of a first cell and a preset rule, a subcarrier group corresponding to a first terminal device in the first cell, where the subcarrier group corresponding to the first terminal device includes some subcarriers in a subcarrier set corresponding to the terminal device. In the method embodiment shown in FIG. 3, the determining unit 1601 is configured to support the first terminal device in performing the process 303 in FIG. 3. The sending unit 1602 is configured to support the base station in performing the process 304 in FIG. 3. The receiving unit 1303 is configured to support the base station in performing the process 302 in FIG. 3. In the method embodiment shown in FIG. 7, the determining unit 1601 is configured to support the first terminal device in performing the process 703 in FIG. 7. The sending unit 1602 is configured to support the base station in performing the process 704 in FIG. 7. The receiving unit 1703 is configured to support the base station in performing the process 702 in FIG. 7. All related content of the steps in the foregoing method embodiments may be cited in function descriptions of the corresponding functional modules. Details are not described herein.

Figure 17:
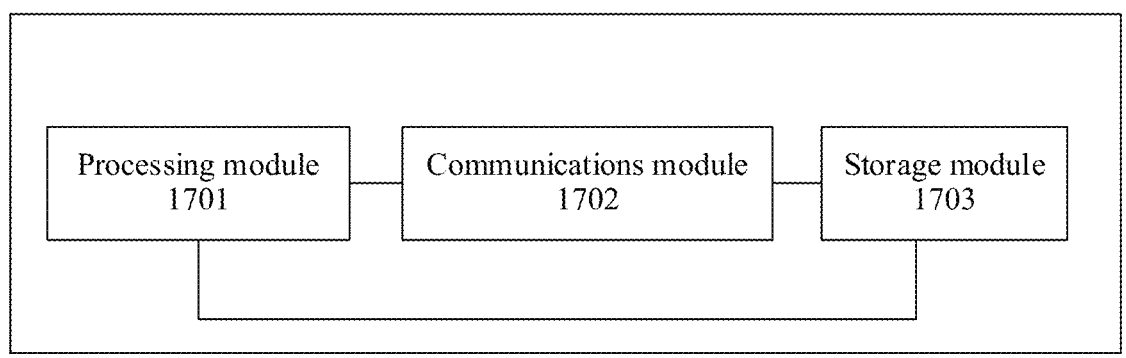
FIG. 17 is a schematic structural diagram of a first terminal device according to an embodiment of this application.

When an integrated unit is used. FIG. 17 is a possible schematic structural diagram of the first terminal device in the foregoing embodiments. In this application, the first terminal device may include a processing module 1701, a communications module 1702, and a storage module 1703. The processing module 1701 is configured to control various hardware apparatuses, application program software, and the like of the first terminal device. The communications module 1702 is configured to receive, in a communication manner such as Wi-Fi, an instruction sent by another device, or may send data of the first terminal device to another device. The storage module 1703 is configured to store a software program of the first terminal device, store data, run software, and the like. The processing module 1701 may be a determining unit or a controller, for example, may be a CPU, a general-purpose determining unit, a DSP, an ASIC, an FPGA, another programmable logic device, a transistor logic device, a hardware component, or any combination thereof. The processor may implement or execute various example logic blocks, modules, and circuits described with reference to content disclosed in this application. Alternatively, the determining unit may be a combination implementing a computing function, for example, a combination including one or more micro determining units, or a combination of a DSP and a micro determining unit. The communications module 1702 may be a transceiver, a transceiver circuit, a communications interface, or the like. The storage module 1703 may be a memory.

Figure 18:
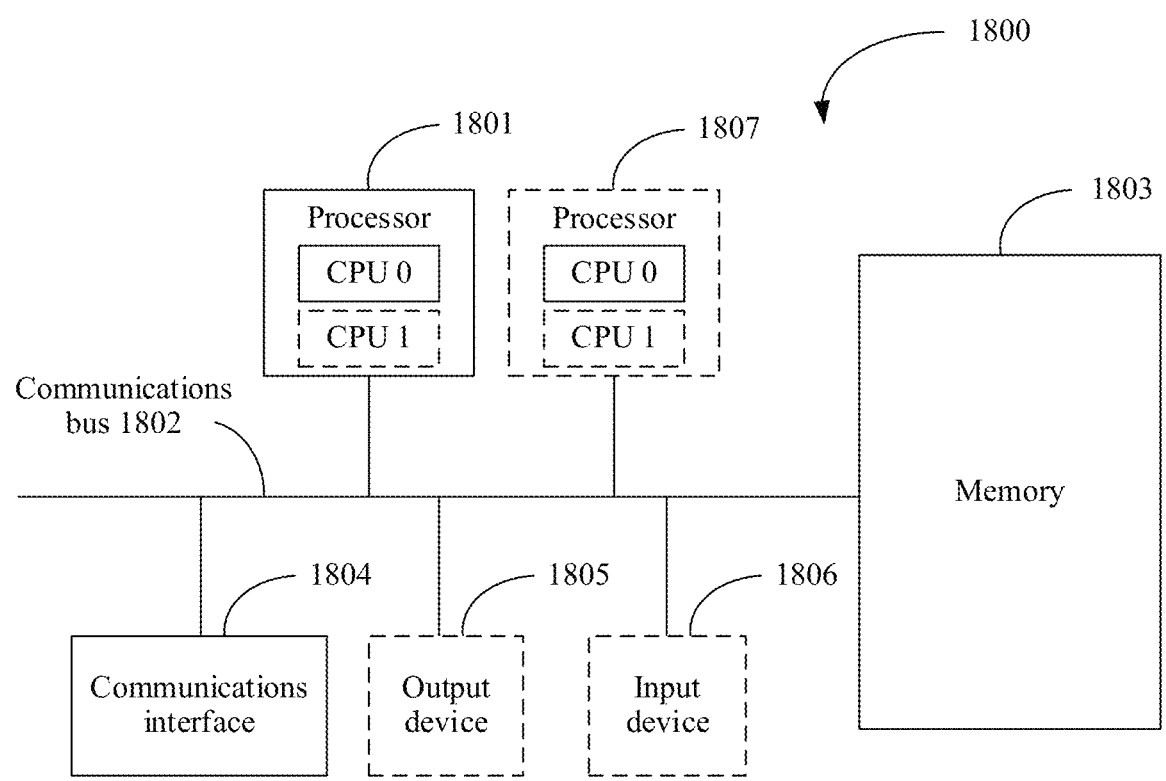
FIG. 18 is a schematic structural diagram of a first terminal device according to an embodiment of this application.

FIG. 18 is a schematic diagram of a computer device according to an embodiment of this application. The computer device 1800 includes at least one determining unit 1801, a communications bus 1802, a memory 1803, and at least one communications interface 1804.

The determining unit 1801 may be a general-purpose central processing unit (CPU), a micro determining unit, an application-specific integrated circuit (ASIC), or one or more integrated circuits configured to control program execution in the solutions of this application.

The communications bus 1802 may include a channel for transmitting information between the foregoing components.

The communications interface 1804 is configured to communicate, through any apparatus such as a transceiver, with another device or a communications network, for example, an Ethernet, a radio access network (RAN), or a wireless local area network (WLAN).

The memory 1803 may be a read-only memory (ROM), another type of static storage device that can store static information and an instruction, a random access memory (RAM), or another type of dynamic storage device that can store information and an instruction, or may be an electrically erasable programmable read-only memory (EEPROM), a compact disc read-only memory (CD-ROM), another optical disc storage (including a compact optical disc, a laser disc, an optical disc, a digital versatile optical disc, a Blu-ray disc, and the like), a magnetic disk storage medium, another magnetic storage device, or any other medium that can carry or store expected program code in a form of an instruction or a data structure and that can be accessed by a computer. This is not limited herein. The memory may exist independently, and is connected to the determining unit through a bus. Alternatively, the memory may be integrated with the determining unit.

The memory 1803 is configured to store application program code for executing the solutions of this application, and the determining unit 1801 is configured to controls execution. The determining unit 1801 is configured to execute the application program code stored in the memory 1803, to implement functions in the method in this patent.

During specific implementation, in an embodiment, the determining unit 1801 may include one or more CPUs, for example, a CPU 0 and a CPU 1 in FIG. 18.

During specific implementation, in an embodiment, the computer device 1800 may include the determining units 1801. Each of the determining units may be a single-CPU (single-CPU) determining unit, or may be a multi-CPU determining unit. The determining unit herein may be one or more devices, circuits, and/or processing cores configured to process data (for example, a computer program instruction).

During specific implementation, in an embodiment, the computer device 1800 may further include an output device 1805 and an input device 1806. The output device 1805 communicates with the determining unit 1801, and may display information in a plurality of manners. For example, the output device 1805 may be a liquid crystal display (LCD), light emitting diode (LED) display device, a cathode ray tube (CRT) display device, a projector, or the like. The input device 1806 communicates with the determining unit 1801, and may receive user input in a plurality of manners. For example, the input device 1806 may be a mouse, a keyboard, a touchscreen device, a sensor device, or the like.

The computer device 1800 may be a general-purpose computer device or a dedicated computer device. During specific implementation, the computer device 1800 may be a desktop computer, a portable computer, a network server, a personal digital assistant (PDA), a mobile phone, a tablet computer, a wireless terminal device, a communications device, an embedded device, or a device having a structure similar to that in FIG. 18. A type of the computer device 1800 is not limited in this embodiment of this application.

Method or algorithm steps described in combination with the content disclosed in this application may be implemented by hardware, or may be implemented by a determining unit by executing a software instruction. The software instruction may be formed by a corresponding software module. The software module may be stored in a RAM, a flash memory, a ROM, an EPROM, an EEPROM, a register, a hard disk, a removable hard disk, a compact disc read-only memory, or a storage medium of any other form well known in the art. For example, the storage medium is coupled to the determining unit, so that the determining unit can read information from the storage medium, and can write information into the storage medium. Certainly, the storage medium may be a component of the determining unit. The determining unit and the storage medium may be located in an ASIC. In addition, the ASIC may be located in a core network interface device. Certainly, the determining unit and the storage medium may exist in the core network interface device as discrete components.

A person skilled in the art should be aware that in the foregoing one or more examples, functions described in this application may be implemented by hardware, software, firmware, or any combination thereof. When the present application is implemented by software, the foregoing functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a general-purpose or dedicated computer.

The objectives, technical solutions, and benefits of this application are further described in detail in the foregoing specific embodiments. It should be understood that the foregoing descriptions are merely specific embodiments of this application, but are not intended to limit the protection scope of this application. Any modification, equivalent replacement or improvement made based on technical solutions of this application shall fall within the protection scope of this application.

A person skilled in the art should understand that the embodiments of this application may be provided as a method, a system, or a computer program product. Therefore, the embodiments of this application may use a form of hardware only embodiments, software only embodiments, or embodiments with a combination of software and hardware. Moreover, the embodiments of this application may use a form of a computer program product that is implemented on one or more computer-usable storage media (including but not limited to a disk memory, a CD-ROM, an optical memory, and the like) that include computer-usable program code.

The embodiments of this application are described with reference to the flowcharts and/or block diagrams of the method, the device (system), and the computer program product according to the embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a determining unit of any other programmable data processing device to generate a machine, so that the instructions executed by a computer or a determining unit of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

It is clearly that a person skilled in the art can make various modifications and variations to embodiments of this application without departing from the spirit and scope of this application. This application is intended to cover these modifications and variations provided that they fall within the scope of protection defined by the following claims and their equivalent technologies.

What is claimed is:

1. A resource allocation method, comprising:
determining, by a first terminal device based on a physical cell identity (PCID) of a first cell accessed by the first terminal device and a preset rule, a first subcarrier group corresponding to the first terminal device, wherein the first subcarrier group corresponding to the first terminal device comprises one or more subcarriers in a subcarrier set corresponding to the first terminal device; wherein the first terminal device corresponds to at least two candidate subcarrier groups, and each candidate subcarrier group comprises a plurality of consecutive subcarriers; and
wherein:
the first terminal device corresponds to two candidate subcarrier groups when the subcarrier set corresponding to the first terminal device comprises three consecutive subcarriers of one resource block, and the subcarrier group corresponding to the first terminal device comprises two consecutive subcarriers in the subcarrier set, wherein a first candidate subcarrier group comprises a first subcarrier and a second subcarrier in the subcarrier set, and a second candidate subcarrier group comprises the second subcarrier and a third subcarrier in the subcarrier set; or
the first terminal device corresponds to four candidate subcarrier groups when the subcarrier set corresponding to the first terminal device comprises 12 consecutive subcarriers of one resource block, and the subcarrier group corresponding to the first terminal device comprises three consecutive subcarriers in the subcarrier set, wherein a first candidate subcarrier group comprises a first subcarrier to a third subcarrier in the subcarrier set, a second candidate subcarrier group comprises a fourth subcarrier to a sixth subcarrier in the subcarrier set, a third candidate subcarrier group comprises a seventh subcarrier to a ninth subcarrier in the subcarrier set, and a fourth candidate subcarrier group comprises a tenth subcarrier to a twelfth subcarrier in the subcarrier set.

2. The method according to claim 1, wherein when the subcarrier set corresponding to the first terminal device comprises three consecutive subcarriers of one resource block, and the subcarrier group corresponding to the first terminal device comprises two consecutive subcarriers in the subcarrier set, the determining, by the first terminal device based on the PCID of the first cell, the first subcarrier group corresponding to the first terminal device in one time interval or each of more than one consecutive time interval corresponding to the first cell comprises:
when M is an odd number, the first terminal device corresponds to the first candidate subcarrier group in an initial time interval in the at least one consecutive time interval corresponding to the first cell, and when M is an even number, the first terminal device corresponds to the second candidate subcarrier group in the initial time interval, wherein M=PCID mod N, N is a positive integer, PCID is the PCID of the first cell, and mod is a modulo operation; or
when M is an even number, the first terminal device corresponds to the first candidate subcarrier group in an initial time interval in the at least one consecutive time interval corresponding to the first cell, and when M is an odd number, the first terminal device corresponds to the second candidate subcarrier group in the initial time interval, wherein M=PCID mod N, N is a positive integer, PCID is the PCID of the first cell, and mod is a modulo operation.

3. The resource allocation method according to claim 1, wherein the first terminal device corresponds to at least two candidate subcarrier groups and a second terminal device corresponds to at least two candidate subcarrier groups in a same subcarrier set, the method further comprising:
accessing, by the first terminal device, a local cell, and accessing, by the second terminal device, a neighboring cell;
wherein the first terminal device accessing the local cell and the second terminal device accessing the neighboring cell correspond to different subcarrier groups in the subcarrier set.

4. The resource allocation method according to claim 1, wherein the first terminal device corresponds to at least two candidate subcarrier groups and a second terminal device corresponds to at least two candidate subcarrier groups in a same subcarrier set, the method further comprising:

accessing, by the first terminal device, a local cell, and accessing, by the second terminal device, a neighboring cell;

wherein the first terminal device accessing the local cell corresponds to second and third subcarriers in the subcarrier set, and the second terminal device accessing the neighboring cell corresponds to a first and the second subcarriers in the subcarrier set.

5. A resource allocation method, comprising:

determining, by a base station based on a physical cell identity (PCID) of a first cell and a preset rule, a first subcarrier group corresponding to a first terminal device in the first cell, wherein the first subcarrier group corresponding to the first terminal device comprises one or more subcarriers in a subcarrier set corresponding to the first terminal device;

wherein the first terminal device corresponds to at least two candidate subcarrier groups, and each candidate subcarrier group comprises a plurality of consecutive subcarriers; and wherein:
the first terminal device corresponds to two candidate subcarrier groups when the subcarrier set corresponding to the first terminal device comprises three consecutive subcarriers of one resource block, and the subcarrier group corresponding to the first terminal device comprises two consecutive subcarriers in the subcarrier set, wherein a first candidate subcarrier group comprises a first subcarrier and a second subcarrier in the subcarrier set, and a second candidate subcarrier group comprises the second subcarrier and a third subcarrier in the subcarrier set; or the first terminal device corresponds to four candidate subcarrier groups when the subcarrier set corresponding to the first terminal device comprises 12 consecutive subcarriers of one resource block, and the subcarrier group corresponding to the first terminal device comprises three consecutive subcarriers in the subcarrier set, wherein a first candidate subcarrier group comprises a first subcarrier to a third subcarrier in the subcarrier set, a second candidate subcarrier group comprises a fourth subcarrier to a sixth subcarrier in the subcarrier set, a third candidate subcarrier group comprises a seventh subcarrier to a ninth subcarrier in the subcarrier set, and a fourth candidate subcarrier group comprises a tenth subcarrier to a twelfth subcarrier in the subcarrier set.

6. The resource allocation method according to claim 5, wherein the first terminal device corresponds to at least two candidate subcarrier groups and a second terminal device corresponds to at least two candidate subcarrier groups in a same subcarrier set, the method further comprising:

accessing, by the first terminal device, a local cell, and accessing, by the second terminal device, a neighboring cell;

wherein the first terminal device accessing the local cell and the second terminal device accessing the neighboring cell correspond to different subcarrier groups in the subcarrier set.

7. A first terminal device, comprising:

a processor, configured to determine, based on a physical cell identity (PCID) of a first cell accessed by the first terminal device and a preset rule, a first subcarrier group corresponding to the first terminal device, wherein the first subcarrier group corresponding to the first terminal device comprises one or more subcarriers in a subcarrier set corresponding to the first terminal device; wherein the first terminal device corresponds to at least two candidate subcarrier groups, and each candidate subcarrier group comprises a plurality of consecutive subcarriers; and wherein:
the first terminal device corresponds to two candidate subcarrier groups when the subcarrier set corresponding to the first terminal device comprises three consecutive subcarriers of one resource block, and the subcarrier group corresponding to the first terminal device comprises two consecutive subcarriers in the subcarrier set, wherein a first candidate subcarrier group comprises a first subcarrier and a second subcarrier in the subcarrier set, and a second candidate subcarrier group comprises the second subcarrier and a third subcarrier in the subcarrier set; or the first terminal device corresponds to four candidate subcarrier groups when the subcarrier set corresponding to the first terminal device comprises 12 consecutive subcarriers of one resource block, and the subcarrier group corresponding to the first terminal device comprises three consecutive subcarriers in the subcarrier set, wherein a first candidate subcarrier group comprises a first subcarrier to a third subcarrier in the subcarrier set, a second candidate subcarrier group comprises a fourth subcarrier to a sixth subcarrier in the subcarrier set, a third candidate subcarrier group comprises a seventh subcarrier to a ninth subcarrier in the subcarrier set, and a fourth candidate subcarrier group comprises a tenth subcarrier to a twelfth subcarrier in the subcarrier set.

8. The first terminal device according to claim 7, wherein when the subcarrier set corresponding to the first terminal device comprises three consecutive subcarriers of one resource block, and the subcarrier group corresponding to the first terminal device comprises two consecutive subcarriers in the subcarrier set, when M is an odd number, the first terminal device corresponds to the first candidate subcarrier group in an initial time interval in the at least one consecutive time interval corresponding to the first cell, and when M is an even number, the first terminal device corresponds to the second candidate subcarrier group in the initial time interval, wherein M=PCID mod N, N is a positive integer, PCID is the PCID of the first cell, and mod is a modulo operation; or when M is an even number, the first terminal device corresponds to the first candidate subcarrier group in an initial time interval in the at least one consecutive time interval corresponding to the first cell, and when M is an odd number, the first terminal device corresponds to the second candidate subcarrier group in the initial time interval, wherein M=PCID mod N, N is a positive integer, PCID is the PCID of the first cell, and mod is a modulo operation.

9. The first terminal device according to claim 7, wherein the first terminal device corresponds to at least two candidate subcarrier groups and a second terminal device corresponds to at least two candidate subcarrier groups in a same subcarrier set, the method further comprising:

accessing, by the first terminal device, a local cell, and accessing, by the second terminal device, a neighboring cell;

wherein the first terminal device accessing the local cell and the second terminal device accessing the neighboring cell correspond to different subcarrier groups in the subcarrier set.

10. A base station, comprising:

a processor, configured to determine, based on a physical cell identity (PCID) of a first cell and a preset rule, a first subcarrier group corresponding to a first terminal device in the first cell, wherein the subcarrier group corresponding to the first terminal device comprises one or more subcarriers in a subcarrier set corresponding to the first terminal device;

wherein the first terminal device corresponds to at least two candidate subcarrier groups, and each candidate subcarrier group comprises a plurality of consecutive subcarriers; and wherein:

the first terminal device corresponds to two candidate subcarrier groups when the subcarrier set corresponding to the first terminal device comprises three consecutive subcarriers of one resource block, and the subcarrier group corresponding to the first terminal device comprises two consecutive subcarriers in the subcarrier set, wherein a first candidate subcarrier group comprises a first subcarrier and a second subcarrier in the subcarrier set, and a second candidate subcarrier group comprises the second subcarrier and a third subcarrier in the subcarrier set; or the first terminal device corresponds to four candidate subcarrier groups when the subcarrier set corresponding to the first terminal device comprises 12 consecutive subcarriers of one resource block, and the subcarrier group corresponding to the first terminal device comprises three consecutive subcarriers in the subcarrier set, wherein a first candidate subcarrier group comprises a first subcarrier to a third subcarrier in the subcarrier set, a second candidate subcarrier group comprises a fourth subcarrier to a sixth subcarrier in the subcarrier set, a third candidate subcarrier group comprises a seventh subcarrier to a ninth subcarrier in the subcarrier set, and a fourth candidate subcarrier group comprises a tenth subcarrier to a twelfth subcarrier in the subcarrier set.

11. The base station according to claim 10, wherein when the subcarrier set corresponding to the first terminal device comprises three consecutive subcarriers of one resource block, and the subcarrier group corresponding to the first terminal device comprises two consecutive subcarriers in the subcarrier set, when M is an odd number, the first terminal device corresponds to the first candidate subcarrier group in an initial time interval in the at least one consecutive time interval corresponding to the first cell, and when M is an even number, the first terminal device corresponds to the second candidate subcarrier group in the initial time interval, wherein M=PCID mod N, N is a positive integer, PCID is the PCID of the first cell, and mod is a modulo operation; or when M is an even number, the first terminal device corresponds to the first candidate subcarrier group in an initial time interval in the at least one consecutive time interval corresponding to the first cell, and when M is an odd number, the first terminal device corresponds to the second candidate subcarrier group in the initial time interval, wherein M PCID mod N, N is a positive integer, PCID is the PCID of the first cell, and mod is a modulo operation.

12. The base station according to claim 10, wherein the first terminal device corresponds to at least two candidate subcarrier groups and a second terminal device corresponds to at least two candidate subcarrier groups in a same subcarrier set, the method further comprising:

accessing, by the first terminal device, a local cell, and accessing, by the second terminal device, a neighboring cell;

wherein the first terminal device accessing the local cell and the second terminal device accessing the neighboring cell correspond to different subcarrier groups in the subcarrier set.

\* \* \* \* \*